United States Patent [19]

Zolock

[11] Patent Number: 5,231,884
[45] Date of Patent: Aug. 3, 1993

[54] TECHNIQUE FOR SUBSTANTIALLY ELIMINATING TEMPERATURE INDUCED MEASUREMENT ERRORS FROM A CORIOLIS METER

[75] Inventor: Michael J. Zolock, Longmont, Colo.

[73] Assignee: Micro Motion, Inc., Boulder, Colo.

[21] Appl. No.: 728,546

[22] Filed: Jul. 11, 1991

[51] Int. Cl.$^5$ .............................................. G01F 1/84
[52] U.S. Cl. ............................ 73/861.38; 324/76.82; 324/601
[58] Field of Search ..................... 73/861.37, 861.38; 324/84 D, 84 Q, 601

[56] References Cited

U.S. PATENT DOCUMENTS

| | | | |
|---|---|---|---|
| 3,585,841 | 6/1971 | Brandau et al. | 73/4 |
| 4,422,338 | 12/1983 | Smith | 73/861.38 |
| 4,491,025 | 1/1985 | Smith et al. | 73/861.38 |
| 4,817,448 | 4/1989 | Hargarten et al. | 73/861.38 |
| 4,843,890 | 7/1989 | Samson et al. | 73/861.38 |
| 4,852,409 | 8/1989 | Herzl | 73/861.38 |
| 4,872,351 | 10/1989 | Ruesch | 73/861.04 |
| 4,876,879 | 10/1989 | Ruesch | 73/32 A |
| 4,879,911 | 11/1989 | Zolock | 73/861.38 |
| 4,896,282 | 1/1990 | Orwell | 364/571.05 |
| 4,934,196 | 6/1990 | Romano | 73/861.38 |
| 5,009,109 | 4/1991 | Kalotay et al. | 73/861.38 |
| 5,027,662 | 7/1991 | Titlow et al. | 73/861.38 |

FOREIGN PATENT DOCUMENTS

| | | | |
|---|---|---|---|
| 0275367 | 7/1988 | European Pat. Off. | 73/861.38 |
| 0151518 | 9/1983 | Japan | 73/861.38 |

Primary Examiner—Herbert Goldstein
Attorney, Agent, or Firm—Peter L. Michaelson; Raymond R. Moser, Jr.

[57] ABSTRACT

Apparatus and accompanying methods for inclusion in a Coriolis meter that substantially eliminate temperature induced measurement errors which might otherwise be produced by performance differences existing between the separate input channels contained in the meter. Specifically, two pairs of input channels are used in the meter. In operation, the meter repetitively measures the internal phase delay of each of these pairs and then subtracts the delay associated with each pair from actual flow based measurement data subsequently obtained therefrom. While one channel pair is measuring actual flow, the other channel pair is measuring its internal phase delay, with the channels being continuously cycled between these functions. Because both channel pairs are cycled at a sufficiently rapid rate, the current value of the internal phase delay for each of the pairs accurately reflects any temperature induced changes then occurring in the performance of that pair thereby eliminating substantially all temperature induced error components from the flow measurements subsequently obtained therefrom. In addition, the meter measures flow tube temperature in a manner that removes temperature induced errors therefrom.

26 Claims, 14 Drawing Sheets

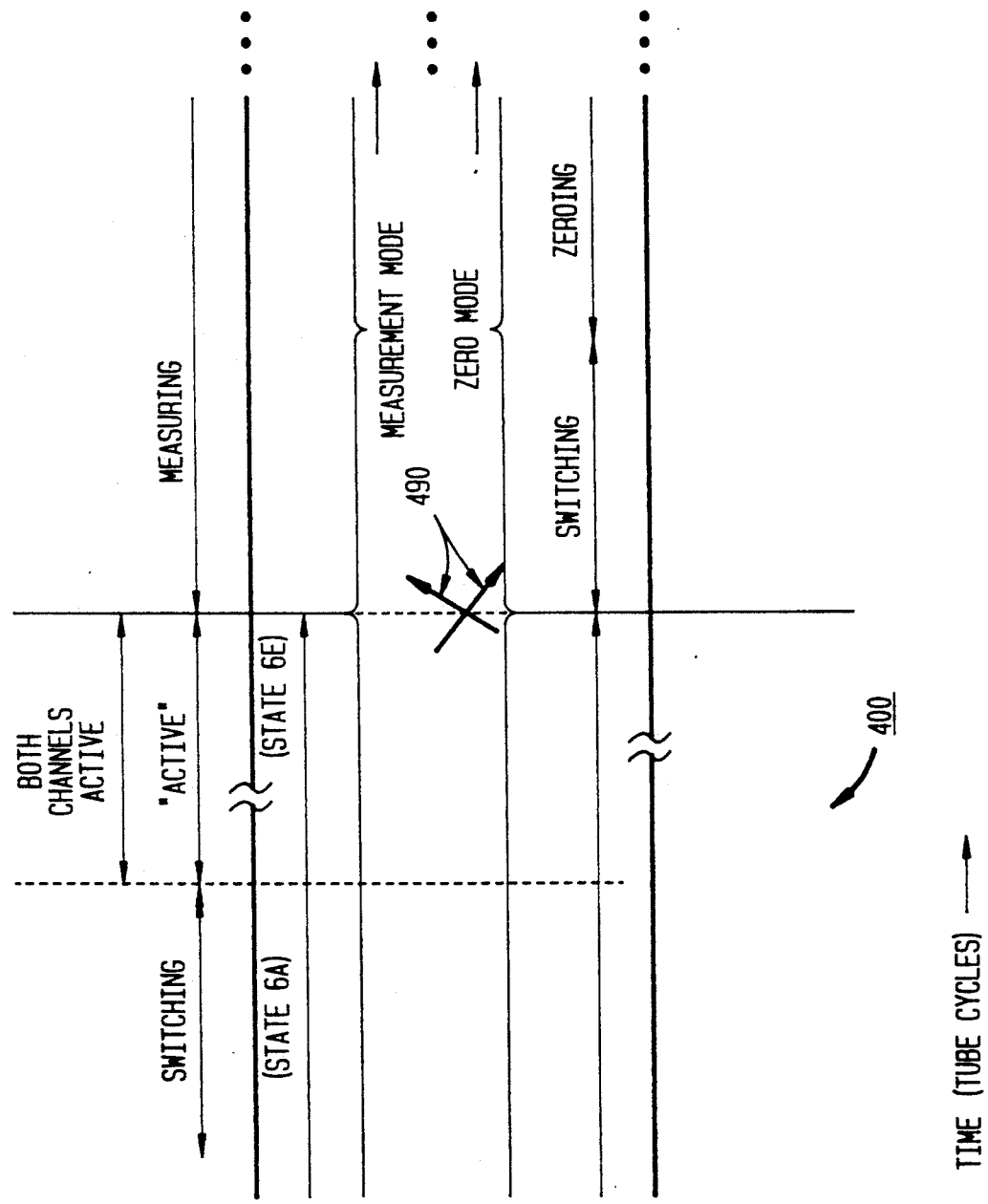

FIG. 5

CIRCUIT 70 STATE TABLE 500

| STATE DESIGNATION | DESCRIPTION | MUX 31 SELECT SIGNALS | | CHANNEL INPUT SIGNAL | | | CHANNEL OPERATION | | | | | | DURATION OF STATE |
|---|---|---|---|---|---|---|---|---|---|---|---|---|---|
| | | RPO_A | RPO_B | C (REFERENCE) | B | A | MEASURING CHANNEL PAIR | | ZEROING CHANNEL PAIR | | SWITCHING CHANNEL | | |
| | | | | | | | A-C | B-C | A-C | B-C | A | B | |
| 2G | CHANNEL B SWITCHING | 0 | 1 | L | L | R | X | | | | | X | SWITCHING INTERVAL ($t_{sw}$) |
| 4G | CHANNEL PAIR B-C ZEROING | 0 | 1 | L | L | R | X | | | X | | | ZEROING INTERVAL ($t_{zero}$) |
| 2G | CHANNEL B SWITCHING | 0 | 0 | L | R | R | X | | | | | X | SWITCHING INTERVAL ($t_{sw}$) |
| 6G | BOTH CHANNELS ACTIVE | 0 | 0 | L | R | R | X | X | | | | | ZEROING INTERVAL ($t_{zero}$) |
| 6A | CHANNEL A SWITCHING | 1 | 0 | L | R | L | | X | | | X | | SWITCHING INTERVAL ($t_{sw}$) |
| 6C | CHANNEL PAIR A-C ZEROING | 1 | 0 | L | R | L | | X | X | | | | ZEROING INTERVAL ($t_{zero}$) |
| 6A | CHANNEL A SWITCHING | 0 | 0 | L | R | R | | X | | | X | | SWITCHING INTERVAL ($t_{sw}$) |
| 6E | BOTH CHANNELS ACTIVE | 0 | 0 | L | R | R | X | X | | | | | ZEROING INTERVAL ($t_{zero}$) |

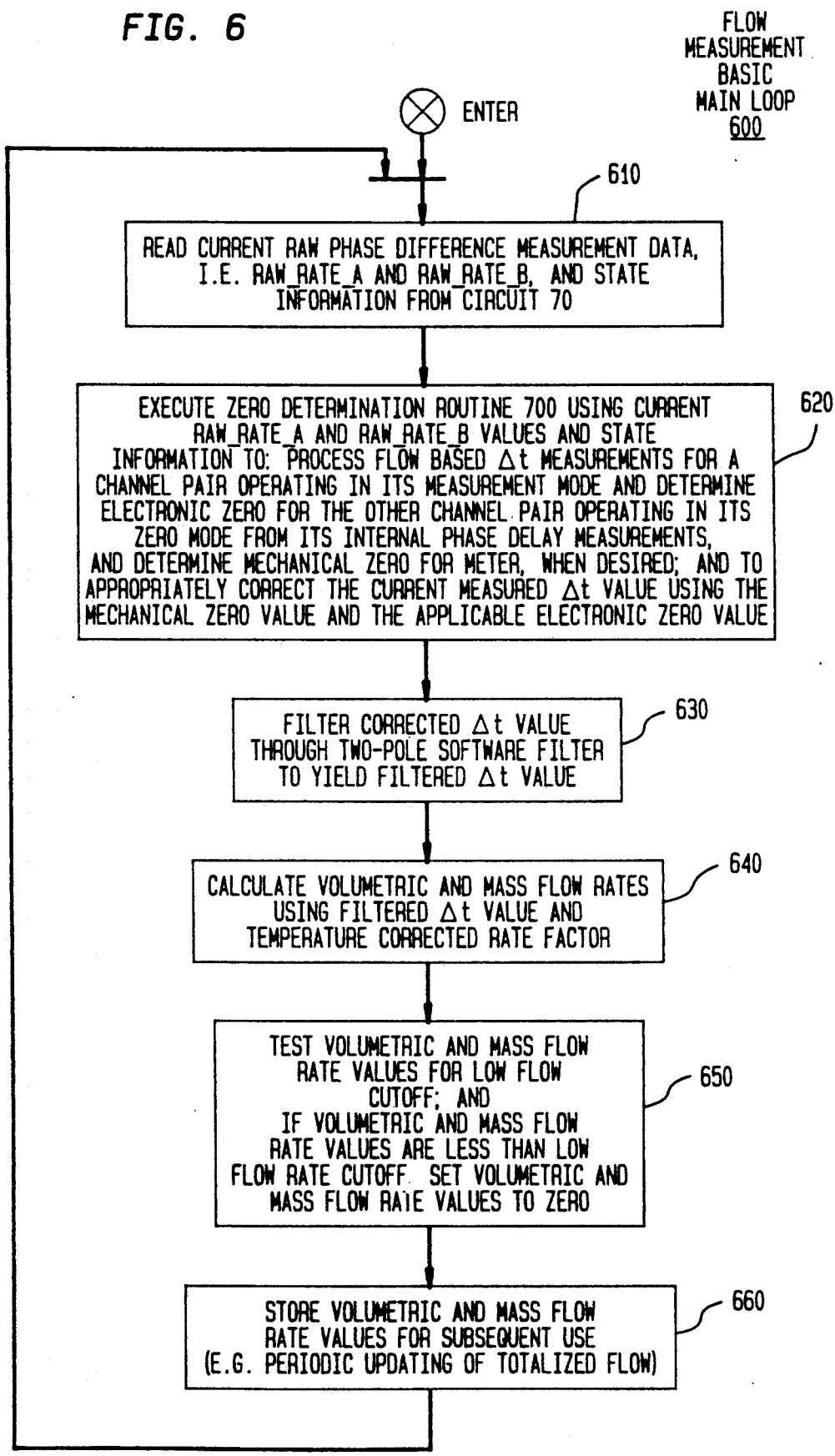

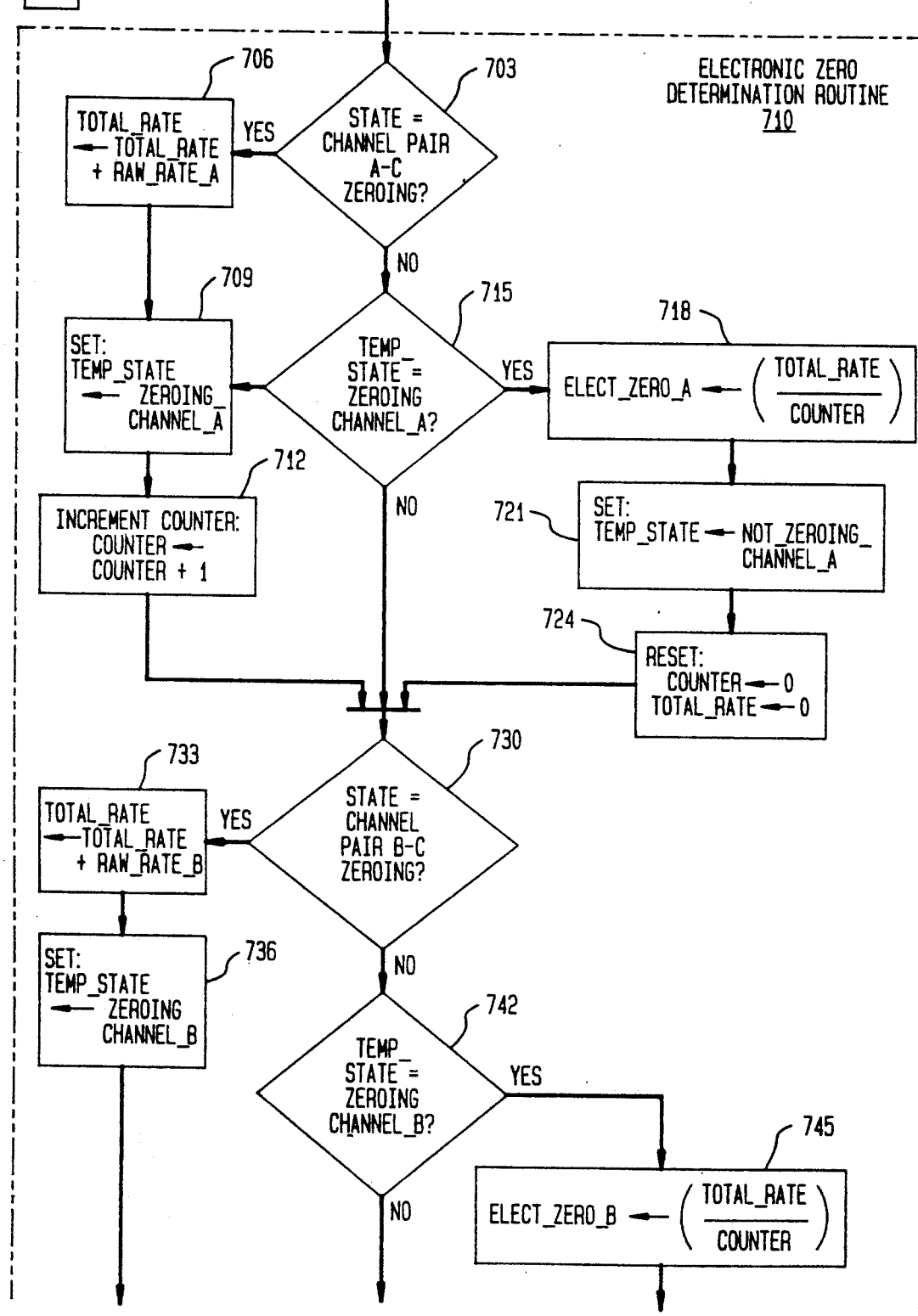

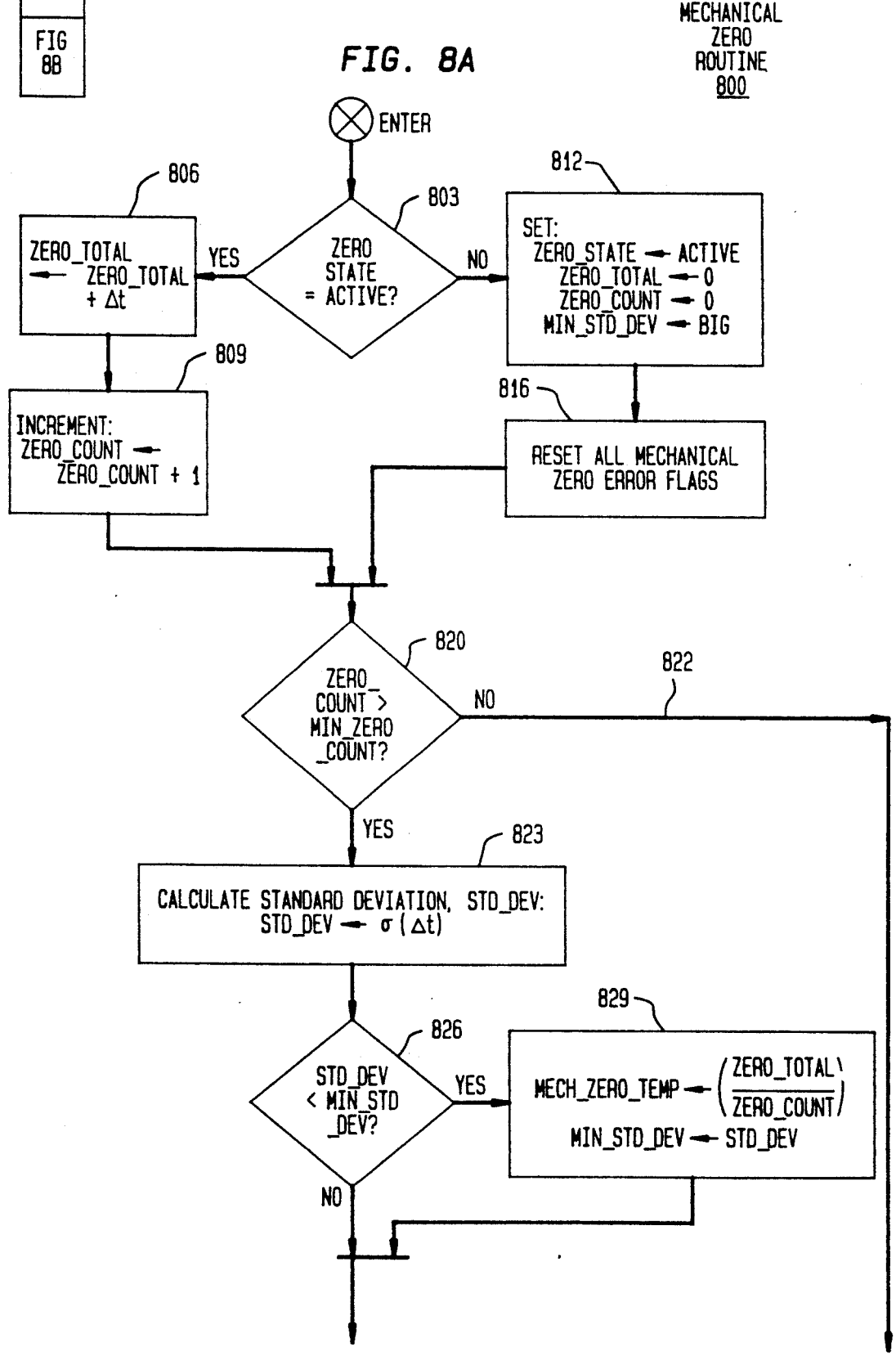

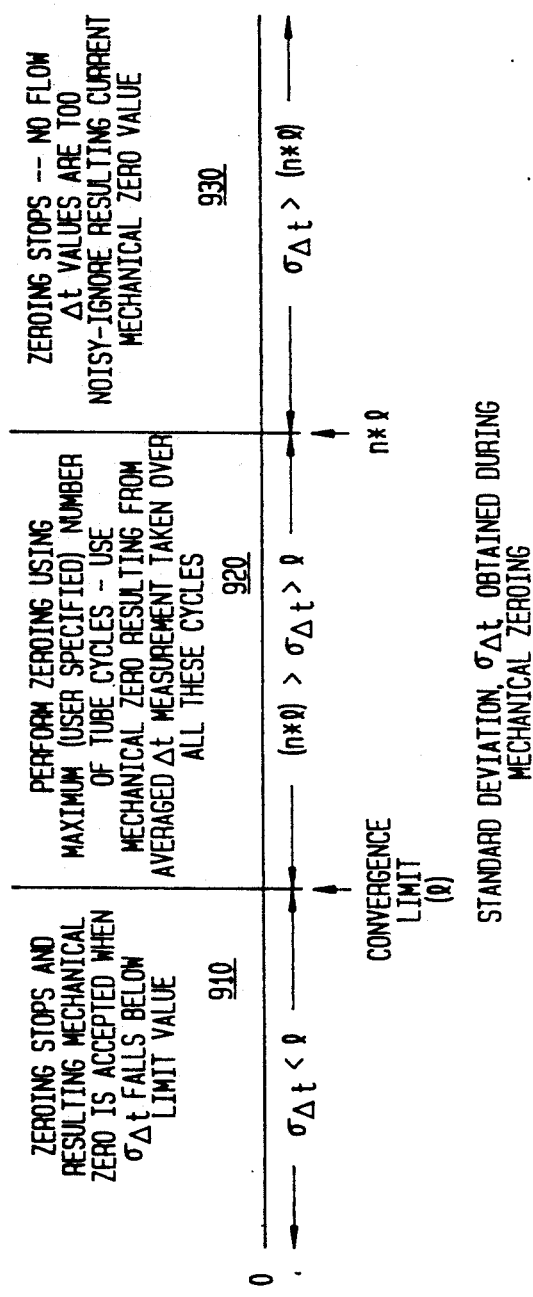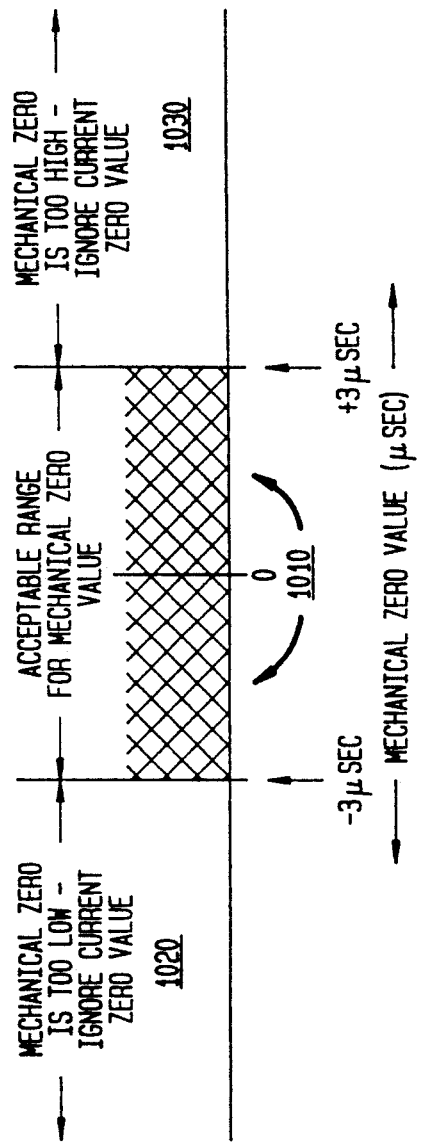
FIG. 9
FIG. 10

TECHNIQUE FOR SUBSTANTIALLY ELIMINATING TEMPERATURE INDUCED MEASUREMENT ERRORS FROM A CORIOLIS METER

CROSS-REFERENCE TO RELATED APPLICATION

This application describes and claims subject matter that is also described in a co-pending United States patent application entitled "A TECHNIQUE FOR DETERMINING A MECHANICAL ZERO VALUE FOR A CORIOLIS METER" from applicant R. Bruck, Ser. No. 728,547, filed Jul. 11, 1991 simultaneously herewith and owned by the present assignee hereof.

BACKGROUND OF THE INVENTION

1. Field of the Invention

The present invention relates to apparatus and methods for inclusion in, illustratively, a Coriolis mass flow rate meter that substantially eliminate temperature induced measurement errors which might otherwise be produced by performance differences existing between two separate input channel circuits contained in the meter.

2. Description of the Prior Art

Currently, Coriolis meters are finding increasing use in a wide variety of commercial applications as an accurate way to measure the mass flow rate of various process fluids.

Generally speaking, a Coriolis mass flow rate meter, such as that described in U.S. Pat. No. 4,491,025 (issued to J. E. Smith et al on Jan. 1, 1985 and owned by the present assignee hereof—hereinafter referred to as the '025 Smith patent), contains one or two parallel conduits, each typically being a U-shaped flow conduit or tube. As stated in the '025 Smith patent, each flow conduit is driven to oscillate about an axis to create a rotational frame of reference. For a U-shaped flow conduit, this axis can be termed the bending axis. As process fluid flows through each oscillating flow conduit, movement of the fluid produces reactionary Coriolis forces that are orthogonal to both the velocity of the fluid and the angular velocity of the conduit. These reactionary Coriolis forces, though quite small when compared to a force at which the conduits are driven, nevertheless cause each conduit to twist about a torsional axis that, for a U-shaped flow conduit, is normal to its bending axis. The amount of twist imparted to each conduit is related to the mass flow rate of the process fluid flowing therethrough. This twist is frequently measured using velocity signals obtained from magnetic velocity sensors that are mounted to one or both of the flow conduits in order to provide a complete velocity profile of the movement of each flow conduit with respect to either the other conduit or a fixed reference. In dual conduit Coriolis meters, both flow conduits are oppositely driven such that each conduit oscillates (vibrates) as a separate tine of a tuning fork. This "tuning fork" operation advantageously cancels substantially all undesirable vibrations that might otherwise mask the Coriolis force.

In such a Coriolis meter, the mass flow rate of a fluid that moves through the meter is generally proportional to the time interval (the so-called "$\Delta t$" value) that elapses between the instant one point situated on a side leg of a flow conduit crosses a pre-determined location, e.g. a respective mid-plane of oscillation, until the instant a corresponding point situated on the opposite side leg of the same flow conduit, crosses its corresponding location, e.g. its respective mid-plane of oscillation. For parallel dual conduit Coriolis mass flow rate meters, this interval is generally equal to the phase difference between the velocity signals generated for both flow conduits at the fundamental (resonant) frequency at which these conduits are driven. In addition, the resonant frequency at which each flow conduit oscillates depends upon the total mass of that conduit, i.e. the mass of the conduit itself, when empty, plus the mass of any fluid flowing therethrough. Inasmuch as the total mass varies as the density of the fluid flowing through the conduit varies, the resonant frequency likewise varies with any changes in fluid density and, as such, can be used to track changes in fluid density.

For some time, the art has taught that both velocity signals are processed through at least some analog circuitry in an effort to generate output signals that are proportional to the mass flow rate of the process fluid. In particular, the output signal associated with each velocity sensor is ordinarily applied through analog circuitry, e.g. an integrator followed by a zero crossing detector (comparator), contained within a separate corresponding input channel. In this regard, see illustratively U.S. Pat. No. 4,879,911 (issued to M. J. Zolock on Nov. 14, 1989), U.S. Pat. No. 4,872,351 (issued to J. R. Ruesch on Oct. 10, 1989), U.S. Pat. No. 4,843,890 (issued to A. L. Samson et al on Jul. 4, 1989) and U.S. Pat. No. 4,422,338 (issued to J. E. Smith on Dec. 27, 1983)—all of which are also owned by the present assignee hereof. While the various approaches taught in these patents provide sufficiently accurate results in a wide array of applications, the meters disclosed in these references, as well as similar Coriolis meters known in the art, nevertheless suffer from a common drawback which complicates their use.

Specifically, Coriolis mass flow meters operate by detecting what amounts to be a very small inter-channel phase difference between the signals produced by both velocity sensors, i.e. the $\Delta t$ value, and transforming this difference into a signal proportional to mass flow rate. While, at its face, a $\Delta t$ value is obtained through a time difference measurement, this value, in actuality, is also a phase measurement. Using such a time difference measurement conveniently provides a way to accurately measure a manifestation of a phase difference appearing between the velocity sensor signals. In Coriolis meters currently manufactured by the present assignee, this difference tends to amount to approximately 130 $\mu$sec at maximum flow. Each input channel in a Coriolis meter imparts some internal phase delay to its input signal. While the amount of this delay is generally quite small, it is often significant when compared to the small inter-channel phase difference, i.e. 130 $\mu$sec or less, that is being detected. Currently available Coriolis meters have relied on assuming that each input channel imparts a finite and fixed amount of phase delay to its corresponding velocity signal. As such, these Coriolis meters generally rely on first measuring, at a true zero flow condition occurring during meter calibration, either the inter-channel phase difference ($\Delta t$) or the indicated mass flow rate. Subsequently, while metering actual flow, these meters will then subtract the resulting value, in some fashion, from either the measured $\Delta t$ or mass flow rate value, as appropriate, in order to generate an ostensibly accurate mass flow rate value for the process fluid then flowing therethrough.

Unfortunately, in practice, this assumption has proven to be inaccurate. First, not only does each input channel often produce a different amount of internal phase delay with respect to the other, but also the phase delay that is produced by each channel is temperature dependent and varies differently from one channel to the other with corresponding changes in temperature. This temperature variability results in a temperature induced inter-channel phase difference. Because the measured phase difference ($\Delta t$) that results from actual flow through the meter is relatively small, then an error in the measured phase difference between the velocity signals and attributable to the temperature induced inter-channel phase difference can, in certain instances, be significant. This error is generally not taken into account in currently available Coriolis mass flow rate meters. In certain situations, this error can impart a noticeable temperature dependent error into mass flow rate measurements, thereby corrupting the measurements somewhat.

In an effort to avoid this error, one well known solution in the art is to shroud an installed piped Coriolis meter, including its electronics, with a temperature controlled enclosure. This approach, which prevents the meter from being exposed to external temperature variations and maintains the meter at a relatively constant temperature while it is in operation, greatly increases the installed cost of the meter and is thus not suited for every application. Hence, in those applications where installed cost is a concern, this approach is generally not taken. Specifically, in those applications and particularly where the meter is to be sited indoors and not exposed to wide temperature variations, then the measurement error which results from the temperature induced inter-channel phase difference, while generally expected, tends to remain quite small and relatively constant. As such, this error is usually tolerated by a user. Unfortunately, in other applications where the meter is not housed in a temperature controlled enclosure, such as outdoor installations where the meter is expected to experience wide fluctuations in operating temperature, the error generally varies and can become significant, and thus needs to be taken into account.

Apart from errors arising from temperature induced inter-channel phase differences, many currently available Coriolis mass flow rate meters also disadvantageously exhibit an additional source of measurement inaccuracy related to temperature. In particular, Coriolis meters generally measure the temperature of the flow conduit and, owing to changes in flow conduit elasticity with temperature, accordingly modify a meter factor value based upon the current temperature of the conduit. This meter factor, as modified, is then subsequently used to proportionally relate the inter-channel phase difference ($\Delta t$) value to mass flow rate. Flow conduit temperature is measured by digitizing an output of a suitable analog temperature sensor, such as a platinum RTD (resistive temperature device), that is mounted to an external surface of a flow conduit. The digitized output usually takes the form of a frequency signal, oftentimes produced by a voltage-to-frequency (V/F) converter, that is totalized (counted) over a given timing interval to yield an accumulated digital value that is proportional to flow conduit temperature. Unfortunately, in practice, V/F converters usually exhibit some temperature drift which, based upon the magnitude of a change in ambient temperature, could lead to an error, amounting to as much as several degrees, in the measurement of flow conduit temperature. This error will, in turn, corrupt the mass flow rate.

A solution proposed in the art to ostensibly deal with temperature dependent variations in the performance of the input channels of Coriolis meters is taught in U.S. Pat. No. 4,817,448 (issued to J. W. Hargarten et al on Apr. 4, 1989 and also owned by the present assignee hereof—hereinafter referred to as the '448 Hargarten et al patent). This patent discloses a two channel switching input circuit for use in a Coriolis meter. In particular, this circuit includes a two-pole two-throw FET (field effect transistor) switch located between the outputs of the velocity sensors and the inputs to both of the channels. In one position, the FET switch connects the outputs of the left and right velocity sensors to corresponding inputs of the left and right channels, respectively; while in the opposite position, these connections are reversed. The switch is operated to change its position at every successive cycle of flow conduit movement. In this manner, the output of each velocity sensor is alternately applied to both channels in succession. Over a two cycle interval, appropriate time intervals are measured with respect to the velocity waveforms applied to both channels and then averaged together to yield a single time interval value from which errors attributable to each individual channel have been canceled. This resulting time interval value is then used in determining mass flow rate through the meter.

While this solution does indeed substantially eliminate temperature induced inter-channel phase differences, it possesses a drawback which limits its utility somewhat. Specifically, this input circuits in the apparatus taught in '448 Hargarten et al patent do not include integrators. Owing to the lack of any low pass filtering that would have been provided by integrators, these input circuits are therefore susceptible to noise. Unfortunately, the switching scheme taught in this patent does not permit integrators to be included in the switched portion of the input circuitry, hence requiring that, to provide noise immunity, an integrator must be located after the FET switch. Unfortunately, in this location, the phase delay inherent in the integrator can not be readily compensated, if at all. Inasmuch as the integrator disadvantageously tends to provide the largest source of phase delay in the input circuitry, inclusion of such an integrator would add an error component, i.e. an uncompensated phase delay, to the measured $\Delta t$ values. Moreover, this phase delay would also vary with temperature changes. Consequently, the resulting measured flow rate values would contain an error component. Thus, it became apparent that the solution posed in the '448 Hargarten et al patent has limited applicability to relatively noise-free environments.

Therefore, a need exists in the art for a Coriolis meter that provides accurate flow and flow rate output values that are substantially insensitive to ambient temperature variations and hence does not appreciably exhibit adverse temperature affects an could provide appreciable noise immunity. Such a meter should possess negligible, if any, temperature induced measurement inaccuracies over relatively wide variations in ambient temperature thereby permitting the meter to be used to provide highly accurate flow measurements in a wide variety of applications and particularly without a need to house the meter in a temperature controlled enclosure. Advantageously, the increased measurement accuracy provided by such a meter and the attendant installed cost savings associated therewith would likely broaden the range of applications over which such a meter could be used.

SUMMARY OF THE INVENTION

An object of the present invention is to provide a Coriolis meter that provides accurate output measurements that are substantially insensitive to variations in ambient temperature.

A specific object is to provide such a meter that substantially, if not totally, eliminates the need for a temperature controlled enclosure.

Another specific object is to provide a Coriolis meter in which the measured flow and flow rate values do not contain appreciable error, if any at all, that would otherwise result from switching transients appearing in the input channels.

These and other objects are accomplished in accordance with the teachings of my invention by cycling the operation of each channel, particularly using a relatively short period, between: (a) measuring the internal phase delay of that channel and (b) measuring raw flow based $\Delta t$ value(s). The raw value(s) are then compensated, typically by subtracting, the measured phase delay value therefrom in order to yield a corrected $\Delta t$ value. A current value mass flow rate is then determined using the corrected rather than, as occurs in the art, the raw $\Delta t$ value(s).

Specifically, the two identical input channels (i.e. left and right), as commonly used in prior art Coriolis flow meters, are replaced with two pairs of input channels (i.e. pairs A-C and B-C) that permit the current internal phase delay exhibited by each channel pair to be measured. Each of the channel pairs is operated to cycle between measuring its own internal phase delay, i.e. a "zeroing" mode, and measuring $\Delta t$ values for actual flow conditions, i.e. a "measurement" mode. Given the short cycle time, the current phase delay value accurately reflects any temperature induced changes then occurring in the performance of each channel pair. Once the current internal phase delay value is known for each pair, that value is then used to correct flow based $\Delta t$ values subsequently produced by that pair during its next measurement mode. Because the $\Delta t$ flow based measurements provided by each channel pair are corrected for the current internal phase delay associated with that particular pair, these $\Delta t$ values do not contain any appreciable temperature induced error components regardless of the ambient temperature of the meter and its variation. As such, a Coriolis meter constructed in accordance with my invention, can advantageously be used in environments with widely varying temperatures with essentially no diminution in accuracy owing to temperature changes.

In accordance with the teachings of a preferred embodiment of my invention, my inventive flow measurement circuit utilizes three separate similar input channels (i.e. channels A, B and C) through which inter-channel phase difference measurements are successively and alternately taken for each of two pairs, i.e. pairs A-C and B-C, of the three channels. Channel C serves as a reference channel and is continuously supplied with one of the two velocity waveform sensor signals, and specifically for purposes of the preferred embodiment the left velocity sensor signal, as its input signal. The input to channels A and B is either the left or right velocity sensor signals. While both the zero and measurement modes involve measuring the inter-channel phase difference in a pair of channels, the principal distinction between the modes is that in the zero mode, the same velocity sensor signal is applied to both channels in that pair so that the resulting inter-channel phase difference measurement provides a measurement of the internal phase delay for that pair; while, in the measurement mode, the left and right velocity signals are applied to different corresponding channels in that pair so as to provide a measurement, though uncorrected, of the current flow based $\Delta t$ value for subsequent use in determining current mass flow and flow rate values. Though inter-channel phase difference ($\Delta t$) measurements are taken during both modes, to simplify matters and avoid confusion, I will distinguish between these values in terms of their occurrence. I will henceforth refer to those phase measurements which occur during the zero mode as being inter-channel phase difference measurements and those which occur during the measurement mode as being $\Delta t$ values.

Specifically, for any channel pair operating in the zero mode, such as pair A-C, the same, i.e. left, velocity sensor signal is applied to the inputs of both channels in that pair. Inter-channel phase difference measurements are then successively and repetitively taken during a so-called "zeroing" interval with the results being averaged during this interval. Ideally, if both of the channels in this pair exhibit the same internal phase delay, i.e. the phase delay through channel A equals that of reference channel C, then the resulting inter-channel phase difference measurements will all equal zero. However, in actuality, at any instant, all three channels usually possess different internal phase delays. Nevertheless, since the phase delay for each pair is measured with respect to the same reference channel, i.e. channel C, any differences in the phase delay between the two pairs is caused by differences in the internal phase delay occurring between channels A and B. Once the "zeroing" interval has terminated, the input to the non-reference channel in that pair is switched to the other velocity sensor signal, i.e. the right velocity sensor signal. A finite period of time, i.e. including a so-called "switching" interval, is then allowed to expire before that channel pair is operated in the "measurement" mode during which flow based $\Delta t$ values are measured. The switching interval is sufficiently long to enable all resulting switching transients to settle out.

While one pair of channels, e.g. A-C, is operating in its zero mode, the other pair, e.g. B-C, is operating in its measurement mode in order to provide continuous flow metering. For any channel pair, each successive current flow based $\Delta t$ value obtained during its measurement mode is compensated by, typically subtracting, the most recent value of the internal phase delay that has been measured for this channel pair during its preceding zero mode.

The time during which one channel pair operates in the measurement mode, i.e. the measuring interval, equals the entire time that the other pair operates in the zero mode. This latter time includes the time during which the latter channel switches its non-reference channel input from the right to the left velocity sensor signal, then performs zeroing, and finally switches its non-reference channel input from the left back to the right velocity sensor signal.

At the conclusion of the measurement interval, the channel pairs simply switch modes, with illustratively channel pair B-C initially switching its non-reference channel input from the right to the left velocity sensor signal, and channel pair A-C commencing flow based $\Delta t$ measurements. Once this input switching is complete, channel pair B-C then undertakes zeroing followed by channel 35 switching in the opposite direction—while channel pair A-C remains in the measurement mode, and so on for successive cycles of operation.

Furthermore, in accordance with my inventive teachings, temperature induced errors in the temperature measurement of the flow conduit provided through the RTD, and specifically associated with temperature drift in the V/F converter, are also advantageously eliminated. Specifically, to eliminate these errors, two reference voltages, in addition to the RTD voltage, are selectively and successively converted through the V/F converter into frequency values, in terms of counts, and are then used to define a linear relationship, specifically a proportionality factor, that relates the counted frequency value to measured flow conduit temperature. Then, by simply multiplying the counted frequency value for the RTD voltage by this factor, a value for the corresponding measured flow conduit temperature results. Inasmuch as the reference voltages do not appreciably change, if at all, with temperature variations and are each repetitively converted through the V/F converter at a relatively short periodicity, on the order of illustratively 0.8 seconds, any temperature drift produced by the V/F is accurately reflected in the resulting counted frequency values for the reference voltages themselves. Since temperature drift equally affects the counted values for both reference voltages and the RTD voltage, but does not change the relationships thereamong, the proportionality factor when multiplied by the counted frequency value for the RTD voltage produces a true temperature value that is substantially independent of any temperature drift produced by the V/F converter. By eliminating temperature induced errors in the measured temperature, the meter factor will be appropriately modified in a manner that accurately reflects changes in flow conduit temperature.

Furthermore, while my inventive meter determines a current mechanical zero value (i.e. the zero flow offset value of the meter) based upon a number of no flow $\Delta t$ measurements taken during meter calibration, a feature of my inventive meter is to use that value in subsequently compensating actual flow measurements only if the noise content of these no flow $\Delta t$ measurements is sufficiently low, otherwise that value is ignored. The number of no flow $\Delta t$ measurements is governed by any of three factors: (a) whenever the standard deviation of these measurements falls below a convergence limit; (b) whenever a user manually terminates the mechanical zero process, or (c) if a pre-defined maximum number of such measurements has been taken.

BRIEF DESCRIPTION OF THE DRAWINGS

The teachings of the present invention may be clearly understood by considering the following detailed description in conjunction with the accompanying drawings, in which:

FIG. 4 shows the correct alignment of the drawing sheets for FIGS. 4A and 4B;

FIGS. 4A and 4B collectively depict a timing diagram of the operations performed by channel pairs A-C and B-C in flow measurement circuit 30 shown in FIGS. 3A and 3B;

FIG. 5 depicts a state table of circuit 70 that is contained within flow measurement circuit 30 shown in FIGS. 3A and 3B;

FIG. 6 depicts a simplified flowchart of Flow Measurement Basic Main Loop 600 that is executed by microprocessor 80 that is contained within flow measurement circuit 30 shown in FIGS. 3A and 3B;

FIG. 7 shows the correct alignment of the drawing sheets for FIGS. 7A and 7B;

FIGS. 7A and 7B collectively depict a flowchart of Zero Determination Routine 700 that is executed as part of Main Loop 600 shown in FIGS. 6A and 6B;

FIG. 8 shows the correct alignment of the drawing sheets for FIGS. 8A and 8B;

FIGS. 8A and 8B collectively depict a flowchart of Mechanical Zero Routine 800 that is executed as part of Zero Determination Routine 700 shown in FIGS. 7A and 7B;

FIG. 9 diagrammatically shows the zeroing operations that occur for each corresponding range in the standard deviation, i.e. $\sigma_{\Delta t}$, of the measured $\Delta t$ values that are obtained during a mechanical zero process;

FIG. 10 diagrammatically shows the ranges of acceptable and non-acceptable mechanical zero values.

To facilitate understanding, identical reference numerals have been used, where appropriate, to designate identical elements that are common to the figures.

DETAILED DESCRIPTION

After reading the following description, those skilled in the art will readily appreciate that my inventive technique can be incorporated within a wide variety of circuitry that measures multiple inputs using multiple analog input channels. Advantageously, use of my invention substantially, if not totally, eliminates errors that might otherwise arise from performance differences occurring among the individual channels and attributable to, for example, temperature, aging and/or other phenomena that differently affect the analog circuitry contained therein. Of course, such usage would include any Coriolis meter regardless of whether that meter is measuring flow, flow rate, density or other parameter(s) of a process fluid. Nevertheless, for purposes of brevity, my inventive input circuit will be discussed in the context of a dual conduit (tube) Coriolis meter that specifically measures mass flow rate and totalized mass flow.

Figure 1:
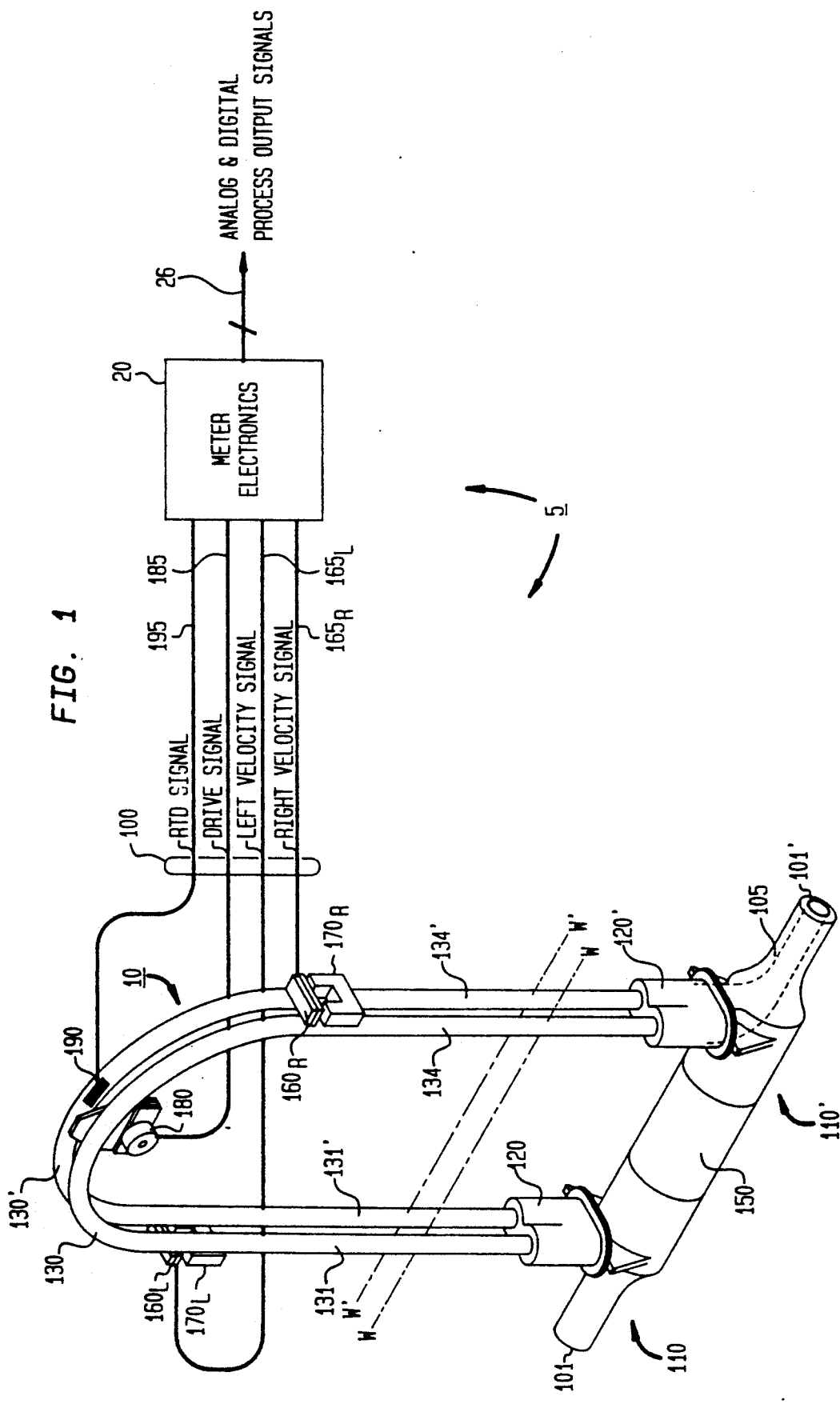
FIG. 1 is an overall diagram of Coriolis mass flow rate metering system 5.

FIG. 1 shows an overall diagram of Coriolis mass flow metering system 5.

As shown, system 5 consists of two basic components: Coriolis meter assembly 10 and meter electronics 20. Meter assembly 10 measures the mass flow rate of a desired process fluid. Meter electronics 20, connected to meter assembly 10 via leads 100, illustratively provides mass flow rate and totalized mass flow information. Mass flow rate information is provided over leads 26 in frequency form and in scaled pulse form. In addition, mass flow rate information is also provided in analog 4-20 mA form over leads 26 for easy connection to downstream process control and/or measurement equipment.

Coriolis meter assembly 10, as shown, includes a pair of manifolds 110 and 110'; tubular member 150; a pair of parallel flow conduits (tubes) 130 and 130'; drive mechanism 180; a pair of velocity sensing coils $160_L$ and $160_R$; and a pair of permanent magnets $170_L$ and $170_R$. Conduits 130 and 130' are substantially U-shaped and have their ends attached to conduit mounting blocks 120 and 120', which are, in turn, secured to respective manifolds 110 and 110', Both flow conduits are free of pressure sensitive joints.

With the side legs of conduits 130 and 130' fixedly attached to conduit mounting blocks 120 and 120' and these blocks, in turn, fixedly attached to manifolds 110 and 110', as shown in FIG. 1, a continuous closed fluid path is provided through Coriolis meter assembly 10. Specifically, when meter 10 is connected, via inlet end 101 and outlet end 101', into a conduit system (not shown) which carries the process fluid that is being measured, fluid enters the meter through an orifice in inlet end 101 of manifold 110 and is conducted through a passageway therein having a gradually changing cross-section to conduit mounting block 120. There, the fluid is divided and routed through flow conduits 130 and 130'. Upon exiting flow conduits 130 and 130', the process fluid is recombined in a single stream within conduit mounting block 120' and is thereafter routed to manifold 110'. Within manifold 110', the fluid flows through a passageway having a similar gradually changing cross-section to that of manifold 110—as shown by dotted lines 105—to an orifice in outlet end 101'. At end 101', the fluid reenters the conduit system. Tubular member 150 does not conduct any fluid. Instead, this member serves to axially align manifolds 110 and 110' and maintain the spacing therebetween by a pre-determined amount so that these manifolds will readily receive mounting blocks 120 and 120' and flow conduits 130 and 130'.

U-shaped flow conduits 130 and 130' are selected and appropriately mounted to the conduit mounting blocks so as to have substantially the same moments of inertia and spring constants about bending axes W—W and W'—W', respectively. These bending axes are perpendicularly oriented to the side legs of the U-shaped flow conduits and are located near respective conduit mounting blocks 120 and 120'. The U-shaped flow conduits extend outwardly from the mounting blocks in an essentially parallel fashion and have substantially equal moments of inertia and equal spring constants about their respective bending axes. Inasmuch as the spring constant of the conduits changes with temperature, resistive temperature detector (RTD) 190 (typically a platinum RTD device) is mounted to one of the flow conduits, here conduit 130', to continuously measure the temperature of the conduit. The temperature of the conduit and hence the voltage appearing across the RTD, for a given current passing therethrough, will be governed by the temperature of the fluid passing through the flow conduit. The temperature dependent voltage appearing across the RTD is used, in a well known method, by meter electronics 20 to appropriately compensate the value of the spring constant for any changes in conduit temperature. The RTD is connected to meter electronics 20 by lead 195.

Both of these flow conduits are driven, typically sinusoidally, in opposite directions about their respective bending axes and at essentially their common resonant frequency. In this manner, both flow conduits will vibrate in the same manner as do the tines of a tuning fork. Drive mechanism 180 supplies the oscillatory driving forces to conduits 130 and 130'. This drive mechanism can consist of any one of many well known arrangements, such as a magnet mounted to illustratively flow conduit 130' and an opposing coil mounted to illustratively flow conduit 130 and through which an alternating current is passed, for sinusoidally vibrating both flow conduits at a common frequency. A suitable drive signal is applied by meter electronics 20, via lead 185, to drive mechanism 180.

With fluid flowing through both conduits while these conduits are driven in opposing directions, Coriolis forces will be generated along adjacent side legs of each of flow conduits 130 and 130' but in opposite directions, i.e. the Coriolis force generated in side leg 131 will oppose that generated in side leg 131'. This phenomenon occurs because although the fluid flows through the flow conduits in essentially the same parallel direction, the angular velocity vectors for the oscillating (vibrating) flow conduits are situated in opposite though essentially parallel directions. Accordingly and as a result of the Coriolis forces, during one-half of the oscillation cycle of both flow conduits, side legs 131 and 131' will be twisted closer together than the minimum distance occurring between these legs produced by just the oscillatory movement of the conduits generated by drive mechanism 180. During the next half-cycle, the generated Coriolis forces will twist side legs 131 and 131' further apart than the maximum distance occurring between these legs produced by just the oscillatory movement of the conduits generated by drive mechanism 180.

During oscillation of the flow conduits, the adjacent side legs, which are forced closer together than their counterpart side legs, will reach the end point of their travel, where their velocity crosses zero, before their counterparts do. The time interval (also referred to herein as the inter-channel phase difference, or time difference or simply "$\Delta t$" value) which elapses from the instant one pair of adjacent side legs reaches their end point of travel to the instant the counterpart pair of side legs, i.e. those forced further apart, reach their respective end point is substantially proportional to the mass flow rate of the fluid flowing through meter assembly 10. The reader is referred to U.S. Pat. No. 4,491,025 (issued to J. E. Smith et al on Jan. 1, 1985) for a more detailed discussion of the principles of operation of parallel path Coriolis flow meters than that just presented.

To measure the time interval, $\Delta t$, coils $160_L$ and $160_R$ are attached to either one of conduits 130 and 130' near their free ends and permanent magnets $170_L$ and $170_R$ are also attached near the free ends of the other one of the conduits. Magnets $170_L$ and $170_R$ are disposed so as to have coils $160_L$ and $160_R$ located in the volume of space that surrounds the respective permanent magnets and in which the magnetic flux fields are essentially uniform. With this configuration, the electrical signal outputs generated by coils $160_L$ and $160_R$ provide a velocity profile of the complete travel of the conduits and can be processed, through any one of a number of well known methods, to determine the time interval and, in turn, the mass flow rate of the fluid passing through the meter. In particular, coils $160_L$ and $160_R$ produce the left and right velocity signals that appear on leads $165_L$ and $165_R$, respectively. As such, coils $160_L$ and $160_R$ and corresponding magnets $170_L$ and $170_R$ respectively form the left and right velocity sensors. While at its face $\Delta t$ is obtained through a time difference measurement, $\Delta t$ is in actuality a phase measurement. Using a time difference measurement here provides an accurate way to measure a manifestation of the phase difference that occurs between the left and right velocity sensor signals.

As noted, meter electronics 20 accepts as input the RTD signal appearing on lead 195, and the left and right velocity signals appearing on leads $165_L$ and $165_R$, respectively. Meter electronics 20 also produces, as noted, the drive signal appearing on lead 185. Leads $165_L$, $165_R$, 185 and 195 are collectively referred to as leads 100. The meter electronics processes both the left and right velocity signals and the RTD signal to determine the mass flow rate and totalized mass flow of the fluid passing through meter assembly 10. This mass flow rate is provided by meter electronics 20 on associated lines within leads 26 in analog 4–20 mA form. Mass flow rate information is also provided in frequency form (typically with a maximum range of 0–10 KHz) over an appropriate line within leads 26 for connection to downstream equipment.

Figure 2:
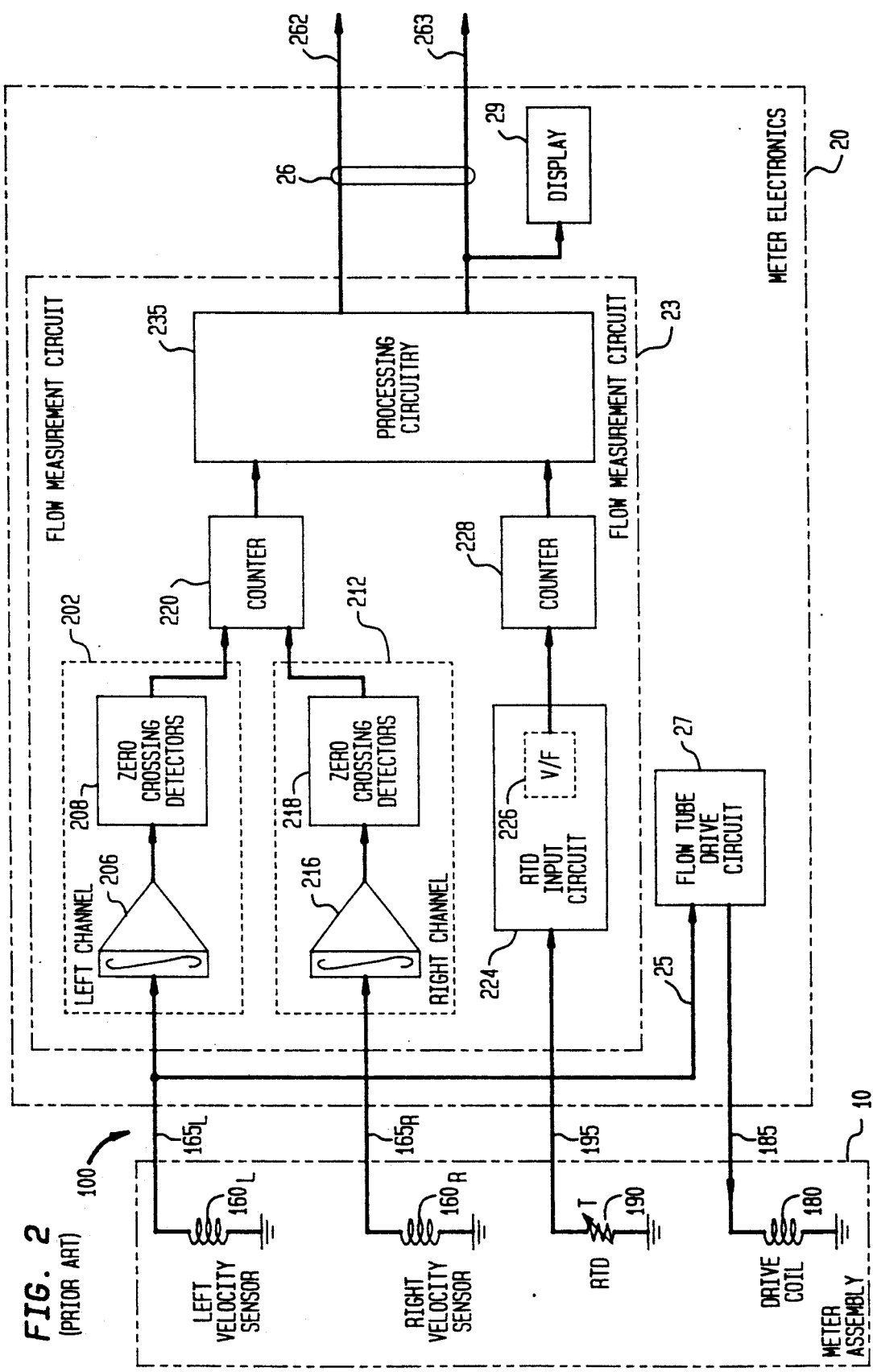
FIG. 2 depicts a high level block diagram of well known meter electronics 20 shown in FIG. 1.

A block diagram of meter electronics 20, as known in the art, is depicted in FIG. 2. Here, as shown, meter electronics 20 consists of flow measurement circuit 23, flow tube drive circuit 27 and display 29.

Flow tube drive circuit 27, depicted in FIG. 2, provides an appropriate repetitive alternating or pulsed drive signal, via lead 185, to drive mechanism 180. This circuit synchronizes the drive signal to the left velocity signal which appears on leads $165_L$ and 25. In operation, circuit 27 maintains both flow tubes in opposing sinusoidal vibratory motion at a fundamental resonant frequency. As is known in the art, this frequency is governed by a number of factors, including various characteristics of the tubes themselves and the density of the process fluid flowing therethrough. Since circuit 27 is very well known in the art and its specific implementation does not form any part of the present invention, this circuit will not be discussed in any further detail herein. In this regard, the reader is illustratively referred to U.S. Pat. No. 5,009,109 (issued to P. Kalotay et al on Apr. 23, 1991); U.S. Pat. No. 4,934,196 (issued to P. Romano on Jun. 19, 1990) and U.S. Pat. No. 4,876,879 (issued to J. Ruesch on Oct. 31, 1989)—all of which are owned by the present assignee hereof and describe different embodiments for the flow tube drive circuit.

Flow measurement circuit 23 processes the left and right velocity signals appearing over leads $165_L$ and $165_R$, respectively, along with the RTD signal appearing on lead 195, in a well known manner, to determine the mass flow rate and totalized mass flow of the process fluid passing through meter assembly 10. The resulting mass flow rate information is provided as a 4–20 mA output signal over lead 263, for easy connection to additional downstream process control equipment (not shown), and as a scaled frequency signal over lead 262 for easy connection to a remote totalizer (also not shown). The signals appearing on leads 262 and 263 form part of the process signals that collectively appear on leads 26 shown in FIG. 1. Other leads (not specifically shown) within leads 26 provide totalized flow information, as well as other process parameters, in digital form for connection to suitable display, telemetry and/or downstream processing equipment.

Inasmuch as the method through which flow measurement circuit 23 generates mass flow and totalized flow rate information is well known to those skilled in the art, only that portion of its constituent electronics that are germane to the present invention will be discussed hereinafter. In this regard, measurement circuit 23 contains two separate input channels: left channel 202 and right channel 212. Each channel contains an integrator and two zero crossing detectors. Within both channels, the left and right velocity signals are applied to respective integrators 206 and 216, each of which effectively forms a low pass filter. The resulting outputs of these integrators are applied to zero crossing detectors (effectively comparators) 208 and 218, each of which generates a level changes whenever the corresponding integrated velocity signal exceeds a voltage window defined by a small predefined positive and negative voltage level, e.g. $\pm v$. The outputs of both zero crossing detectors 208 and 218 are fed as control signals to counter 220 in order to measure a timing interval, in terms of clock pulse counts, that occurs between corresponding changes in these outputs. This interval is the well known $\Delta t$ value and varies with the mass flow rate of the process fluid. The resulting $\Delta t$ value, in counts, is applied, in parallel, as input data to processing circuitry 235. In addition, RTD 190 is connected to an input of RTD input circuit 224 which supplies a constant drive current to the RTD, linearizes the voltage that appears across the RTD and converts this voltage using voltage/frequency (V/F) converter 226 into a stream of pulses that has a scaled frequency which varies proportionally with any changes in RTD voltage. The resulting pulse stream produced by circuit 224 is applied as an input to counter 228 which periodically counts the stream and produces a value, in counts, that is proportional to the measured temperature. The contents of counter 228 are also applied in parallel as input data to processing circuit 235. Processing circuit 235, which is typically a microprocessor based system, determines the current mass flow rate from the digitized $\Delta t$ and temperature values applied thereto. In this regard the digitized temperature value is used to modify a meter factor value based upon the current temperature of the flow tubes and, by doing so, account for changes in flow tube elasticity with temperature. The meter factor, as modified, (i.e. a temperature compensated meter factor—RF) is then subsequently used to proportionally determine the mass flow rate from the current measured $\Delta t$ value. Having determined the mass flow rate, circuitry 235 then updates totalized mass flow and also provides, for example, suitable mass flow rate output signals over leads 26 for connection to local display 29 and/or to downstream process control equipment.

It is now become apparent that the analog circuitry contained within the left and right channels disadvantageously injects some error into the resulting mass flow and mass flow rate values produced by processing circuitry 235. Specifically, not only does each input channel often possess a different amount of internal phase delay with respect to the other, as measured from the input of an integrator to an output of its zero crossing detectors, but also the phase delay that is internally produced by each channel is temperature dependent and often varies differently from one channel to the other with corresponding changes in temperature. As such, left channel 202 may, for example, exhibit phase delay that has a different temperature dependent variation than that exhibited by right channel 212. This variability results in a temperature induced inter-channel phase difference that manifests itself as an error component in the measured $\Delta t$ value. Because the $\Delta t$ value that results from actual flow itself through the meter is relatively small, this error component can, in certain instances, be significant. This error is generally not taken into account in currently available Coriolis mass flow rate meters. In certain situations, particularly where the meter is situated in an outdoors environment and subjected to wide temperature fluctuations, this error can impart a noticeable temperature dependent error into mass flow rate measurements, thereby corrupting these measurements somewhat.

Now, apart from temperature dependent errors in the measured $\Delta t$ value, the temperature measurement circuitry itself imparts an additional source of temperature induced measurement error into the mass flow and flow rate values produced by processing circuitry 235. In this regard, V/F converter 226 contained within RTD input circuit 224 exhibits, as do nearly all such converters, measurable temperature drift. This drift, based upon the magnitude of a change in ambient temperature, may lead to an error, amounting to as much as several degrees, in the measurement of the flow conduit temperature. This error will, in turn, lead to errors in the modified meter factor which, in turn, will also corrupt the mass flow rate and totalized mass flow values.

To eliminate the deficiencies associated with Coriolis meters known in the art and particularly those containing circuitry typified by flow measurement circuit 23, I have developed a technique for use in the flow measurement circuit of a Coriolis meter that advantageously renders the mass flow and mass flow rate values produced by the meter substantially insensitive to temperature changes thereby improving their overall accuracy.

Specifically, in accordance with the teachings of my present invention, the two identical input channels (i.e. left and right), as commonly used in prior art flow measurement circuits, are replaced with two pairs of input channels (i.e. pairs A-C and B-C) that permit the phase delay exhibited by each channel pair to be measured. Once the current value of the phase delay is known for each channel pair, that value is subsequently used to correct flow based $\Delta t$ values subsequently measured by that channel pair. Since each of the channel pairs is operated to cycle, on a relatively short period, between measuring its own internal phase delay, i.e. a "zeroing" mode, and measuring $\Delta t$ values for actual flow conditions, i.e. a "measurement" mode, the current phase delay value accurately reflects any temperature induced changes then occurring in the performance of each channel pair. Because the $\Delta t$ flow based measurements provided by each channel pair are corrected for the current internal phase delay associated with that particular pair, these $\Delta t$ values do not contain any appreciable temperature induced error components regardless of the ambient temperature of the meter and its variation. As such, a Coriolis meter constructed in accordance with my invention, can advantageously be used in environments with widely varying temperatures with essentially no diminution in accuracy owing to temperature changes.

In particular, my inventive flow measurement circuit utilizes three separate similar input channels (i.e. channels A, B and C) through which inter-channel phase difference measurements are successively and alternately taken for each of two pairs, i.e. pairs A-C and B-C, of the three channels. Channel pair A-C contains channels A and C; while channel pair B-C contains channels B and C. Channel C serves as a reference channel and is continuously supplied with one of the two velocity waveform sensor signals, and specifically for purposes of the preferred embodiment the left velocity sensor signal, as its input signal. The input to channels A and B is either the left or right velocity sensor signals. While both the zero and measurement modes involve measuring the inter-channel phase difference in a pair of channels, the principal distinction between the modes is that in the zero mode, the same, i.e. left, velocity sensor signal is applied to both channels in that pair so that the resulting inter-channel phase difference measurement provides a measurement of the internal phase delay for that pair; while, in the measurement mode, the left and right velocity signals are applied to different corresponding channels in that pair so as to provide a measurement, though uncorrected, of the current flow based $\Delta t$ value for subsequent use in determining current mass flow and flow rate values. Though inter-channel phase difference ($\Delta t$) measurements are taken during both modes, to simplify matters and avoid confusion, I will distinguish between these values in terms of their occurrence. Thus, I will henceforth refer to those phase measurements which occur during the zero mode as being inter-channel phase difference measurements and those which occur during the zero mode as being $\Delta t$ values. Also, both the inter-channel phase difference measurements and the $\Delta t$ values for any channel pair will be collectively and hereinafter referred to as timing measurements.

Specifically, for any channel pair operating in the zero mode, such as pair A-C, the same, i.e. left, velocity sensor signal is applied to the inputs of both channels in that pair. Inter-channel phase difference measurements are then successively and repetitively taken during a so-called "zeroing" interval with the results being averaged during this interval. Ideally, if both of the channels in this pair exhibit the same internal phase delay, i.e. the phase delay through channel A equals that of reference channel C, then the resulting inter-channel phase difference measurements will all equal zero. However, in actuality, at any instant, all three channels usually possess different internal phase delays. Nevertheless, since the phase delay for each pair is measured with respect to the same reference channel, i.e. channel C, any differences in the phase delay between the two pairs is caused by differences in the internal phase delay occurring between channels A and B. Once the "zeroing" interval has terminated, the input to the non-reference channel in that pair is switched to the other velocity sensor signal, i.e. the right velocity sensor signal. A finite period of time, i.e. including a so-called "switching" interval, is then allowed to expire before that channel pair is operated in the "measurement" mode during which flow based $\Delta t$ values are measured. The switching interval is sufficiently long to enable all resulting switching transients to settle out, e.g. for their amplitude to decay below a pre-defined level.

While one pair of channels, e.g. A-C, is operating in its zero mode, the other pair, e.g. B-C, is operating in its measurement mode. For any channel pair, each successive measured flow based Δt value that is obtained during its measurement mode is compensated by, typically subtracting, the most recent value of the internal phase delay that has been measured for this channel pair during its preceding zero mode.

The time during which one channel pair operates in the measurement mode, i.e. the measuring interval, equals the entire time that the other pair operates in the zero mode. This latter time (i.e. the "zero" interval) includes the time (i.e. the "switching" interval) during which the latter channel switches its non-reference channel input from the right to the left velocity sensor signal, then performs zeroing (during a so-called "zeroing" interval), and finally switches its non-reference channel input from the left back to the right velocity sensor signal. Note that the zero interval includes both two switching intervals and a zeroing interval.

At the conclusion of the measurement interval, the channel pairs simply switch modes, with illustratively channel pair B-C initially switching its non-reference channel input from the right to the left velocity sensor signal, and channel pair A-C commencing flow based Δt measurements. Once this input switching is complete, channel pair B-C then undertakes zeroing followed by channel switching in the opposite direction—while channel pair A-C remains in the measurement mode, and so on for successive cycles of operation. After a channel pair has completed the latter switching operation but before commencing its operation in the measurement mode, that channel can, if desired, undertake measurements of flow based Δt values for a finite period of time, hereinafter referred to as the "active" interval, which, to simplify implementation, has a duration equal to the "zeroing" interval. Since both channels can simultaneously provide flow based Δt values during the "active" interval from both velocity sensor signals, then, ideally, in the absence of any noise, isolated perturbations or differences between the internal phase delays associated with the pairs of channels, the same Δt values should be produced by both channels. Hence, as an added check, one or more of the measured flow based Δt values obtained from each channel pair during the "active" interval can be compensated by the most recent value of the measured phase delay for that pair to yield corresponding pairs of corrected Δt values. The two values in each such pair could then be compared against each other. A sufficient discrepancy between the values in any of these pairs would generally signify an error condition.

Inasmuch as channel switching only occurs on the channel pair opposite from that which is being used to provide flow based measurements, any switching transients (and noise associated therewith) are effectively isolated from and advantageously do not corrupt the flow and flow rate measurements. Moreover, by allowing an appropriately long switching interval to expire even before zeroing begins, the switching transients advantageously do not affect the internal phase delay measurements for the channel pair being zeroed. As such, the performance of a Coriolis meter that utilizes my invention is substantially, if not totally, immune from input switching transients and the like.

The specific length of time of the switching and zeroing intervals is not critical. However, since switching transients die out rather quickly and additional averaging generally provides increased accuracy for the internal phase delay measurements, the switching interval is typically set to be much shorter than the zeroing interval. In this regard, the switching interval, as measured in tube cycles, may last for illustratively 16–32 such cycles, while the zeroing interval may be set to consume upwards of illustratively 2048 such cycles.

Furthermore, in accordance with my inventive teachings, temperature induced errors in the temperature measurement of the flow tube provided through the RTD, and specifically associated with temperature drift in the V/F converter, are also advantageously eliminated. Specifically, to eliminate these errors, two reference voltages in addition to the RTD voltage are selectively and successively converted through the V/F converter into frequency values, in terms of counts, and are then used to define a linear relationship, specifically a proportionality factor, that relates the counted frequency value to measured flow tube temperature. Then, by simply multiplying the counted frequency value for the RTD voltage by this factor, a value for the corresponding measured flow tube temperature results. Inasmuch as the reference voltages do not appreciably change, if at all, with temperature variations and are each repetitively converted through the V/F converter at a relatively short periodicity, on the order of illustratively 0.8 seconds, any temperature drift produced by the V/F is accurately reflected in the resulting counted frequency values for the reference voltages themselves. Since temperature drift equally affects the counted values for both reference voltages and the RTD voltage, but does not change the relationships thereamong, the proportionality factor when multiplied by the counted frequency value for the RTD voltage produces a true temperature value that is substantially independent of any temperature drift produced by the V/F converter. By eliminating temperature induced errors in the measured temperature, the meter factor will be appropriately modified in a manner that accurately reflects changes in flow tube temperature.

A. Hardware Description

Figures 3, 3A:
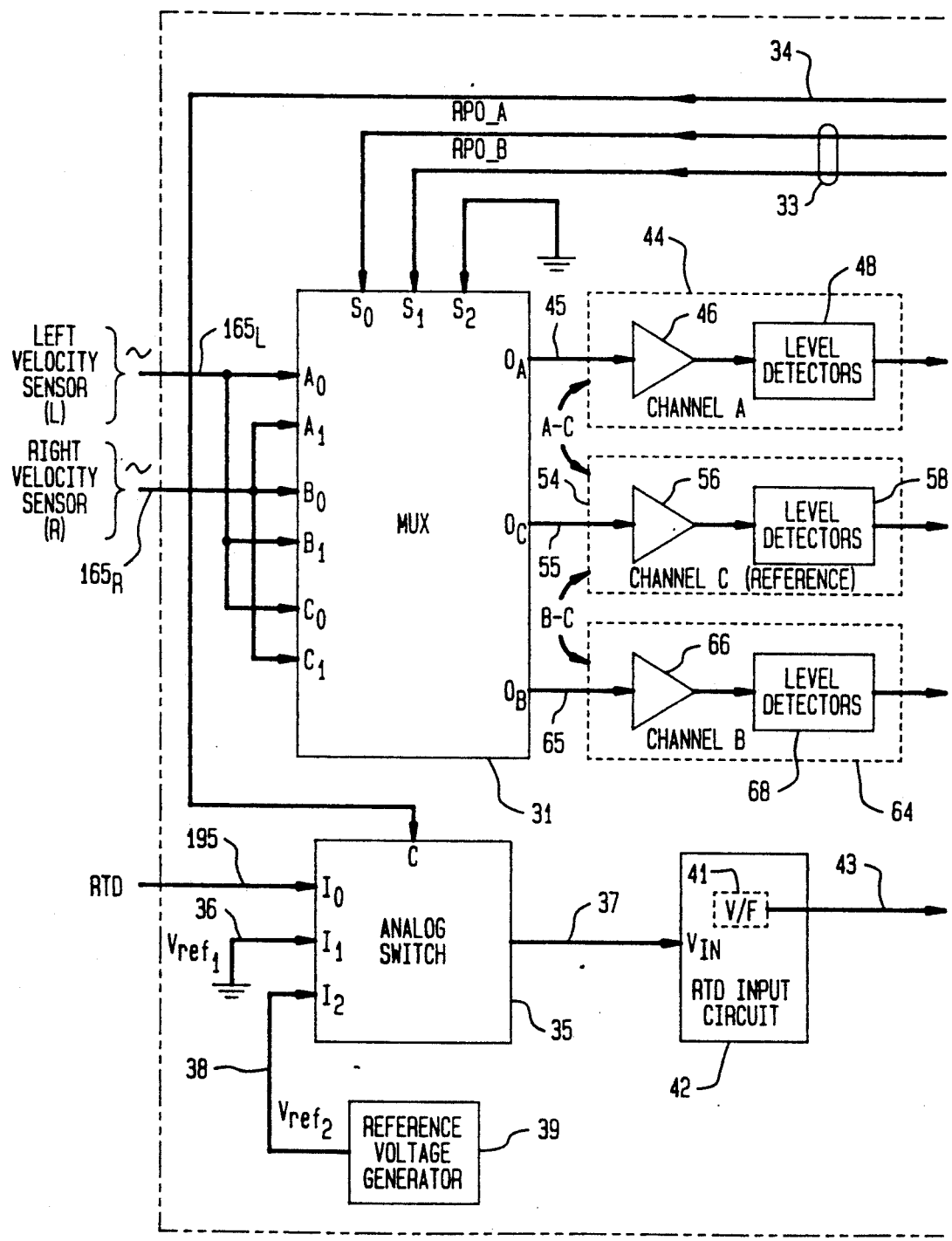
FIG. 3 shows the correct alignment of the drawing sheets for FIGS. 3A and 3B.
FIGS. 3A and 3B collectively depict a high level block diagram of a preferred embodiment of flow measurement circuit 30 according to my present invention.
Figure 3B:
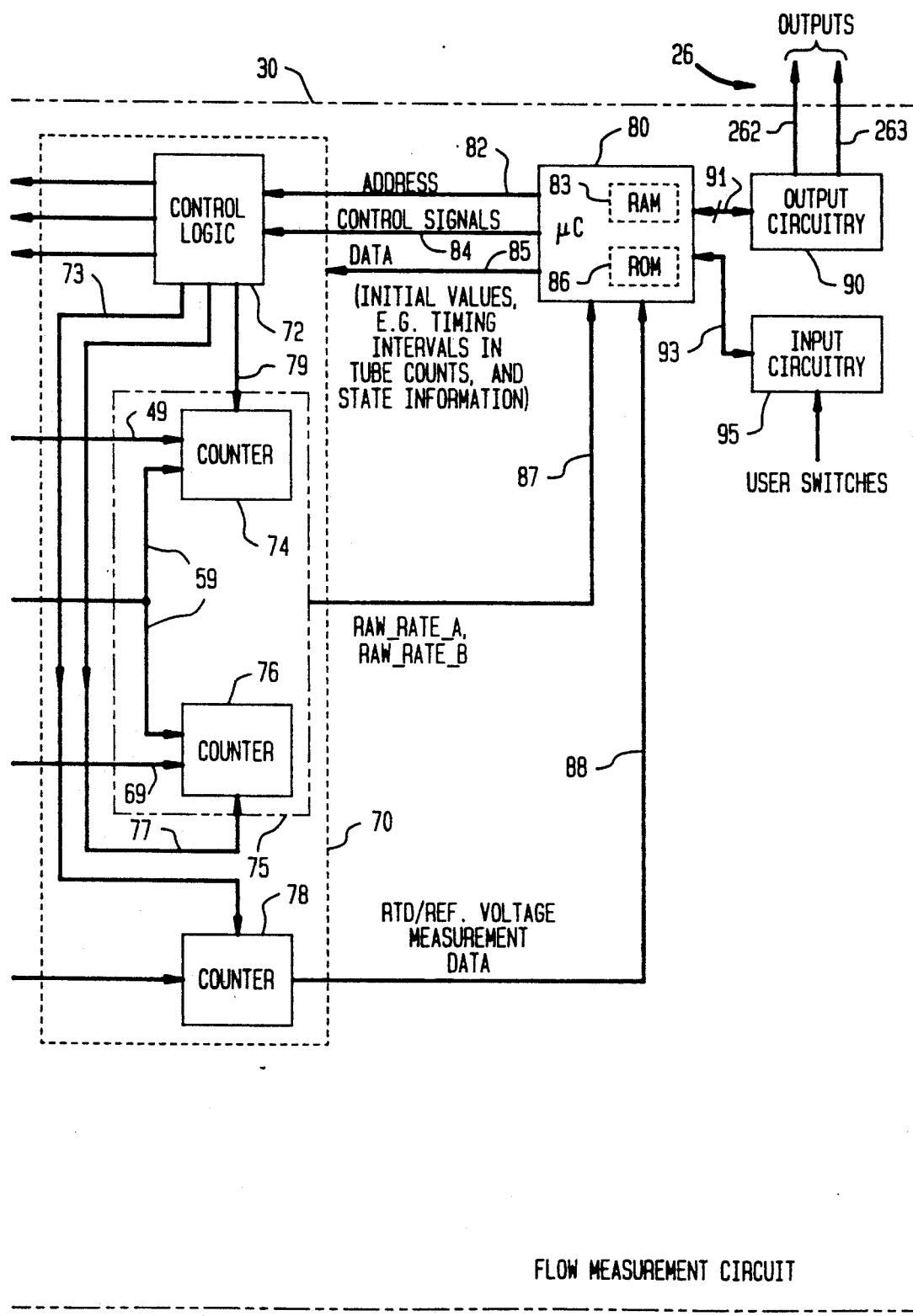

With this description in mind, a high level block diagram of a preferred embodiment of inventive flow measurement circuit 30 is collectively depicted in FIGS. 3A and 3B, for which the correct alignment of the drawing sheets for these figures is shown in FIG. 3.

In essence, flow measurement circuit 30 contains an input multiplexor and three similar input channels—one of which is reference channel C, a finite state machine with associated timing counters, and a microcomputer system. The inputs to the two non-reference channels A and B are selected, through the multiplexor, by the finite state machine, as it cycles through its various states. The outputs from the three channels are applied to the counters in order to generate the timing measurements, i.e. the inter-channel phase difference measurements and the Δt values, for each of the two channel pairs A-C and B-C. The timing measurements provided by these counters along with the state information from the finite state machine are supplied to the microcomputer which, in turn, determines current corresponding values of mass flow rate. In addition, the RTD output and two reference voltages are sequentially converted into corresponding frequency values, through an appropriate input switch, V/F converter and associated circuitry, and counted through a timing counter associated with the finite state machine. The resulting counts therefor are then supplied by this counter to the microcomputer for its use in properly modifying the meter factor.

Specifically, as depicted, flow measurement circuit 30 contains three similar input channels 44, 54 and 64, also respectively referred to herein as Channels A, C and B. In addition, this flow measurement circuit also contains multiplexor 31, circuit 70, analog switch 35, reference voltage generator 39, RTD input circuit 42, microcomputer 80, output circuitry 90 and input circuitry 95.

RTD input circuit 42, shown in FIGS. 3A and 3B, performs the same functions and contains essentially the same circuitry as RTD input circuit 224 shown in FIGS. 2A and 2B and discussed above.

Each of channels A and B, of which channel A is illustrative, contains input analog circuitry, which is simply represented as an amplifier connected to a level detector. With respect to channel A, amplifier 46 provides appropriate input filtering of the left velocity sensor signal, level shifting and amplification of the resulting shifted signal. Level detectors 48, effectively a windowing comparator, provides a level change on its output signal whenever the output signal produced by amplifier 46 increases above or decreases below a small fixed positive and negative voltage. In this regard, each of these channels provides essentially the same functions as corresponding circuitry in flow measurement circuit 23 shown in FIG. 2. Channel C shown in FIGS. 3A and 3B contains circuitry represented by amplifier 56 and level detector 58. Reference channel C is quite similar to channels A and B with the exception that level detector 58 contains a single level detector, rather than a windowing comparator, to detect whenever the output signal from amplifier 56 exceeds a small positive voltage level. Multiplexor 31, which is illustratively formed of three separate 2-to-1 multiplexors selectively routes either the left velocity sensor signal appearing on lead 165$_L$ or the right velocity sensor signal appearing on lead 165$_R$ to the input of each of the three channels In this regard, the left and right velocity sensor signals are applied to the first (A$_0$, B$_0$ and C$_0$) and second (A$_1$, B$_1$ and B$_1$) inputs, respectively, of multiplexor 31. The status of select signals S$_0$, S$_1$ and S$_2$ specifies whether the right or left velocity sensor signal is applied to the three separate (O$_A$, O$_B$, and O$_C$) outputs of the multiplexor. Select signals 33, formed of signals RPO_A and RPO_B connected to select inputs S$_0$ and S$_1$, cause the multiplexor to separately route either the left or right velocity sensor signals as the inputs to channels A and B, respectively; while grounded select signal S$_2$ causes multiplexor 31 to continuously route the left velocity sensor signal appearing on lead 165$_L$ to the input of reference channel C. Select signals 33 are set by control logic 72 in circuit 70 to perform appropriate input switching.

Circuit 70 contains control logic 72 and timing counters 74, 76 and 78. Circuit 70, preferably formed of a single application specific integrated circuit, is essentially a finite state machine that defines a periodic and repetitively occurring sequence of timing intervals and accompanying states. During each such timing interval, externally applied input signals can start and stop an appropriate timing counter. At the conclusion of that interval, the contents of that timing counter can be read in parallel form for subsequent use. As this circuit applies to flow measurement circuit 30, timing counters 74 and 76, grouped together as counters 75, are used to determine the timing measurements for channel pairs A-C and B-C, respectively. Timing counter 78 is used to count the frequency value produced by RTD input circuit 42 for a selected analog input signal applied thereto through switch 35. This counter is reset by control logic 72 prior to each conversion interval by applying an appropriate signal being applied to lead 79. Control logic 72 is formed of well known combinatorial and other logic. After having been initialized with the duration, in tube cycles, of the zeroing and switching intervals, the control logic generates select signals over leads 33 to operate multiplexor 31 to select and route the proper waveform sensor signals to the inputs of either channel A or B, as appropriate, such that the channel pairs are repetitively and oppositely cycled through their zero and measurement modes. In addition, control logic 72 also generates appropriate control signals which, when applied via leads 77 and 79, properly reset counters 76 and 74 for each timing interval. In addition, the control logic generates, on leads 34, appropriate select signals to the control input (C) of analog switch 35. These select signals cause the switch to route a particular one of its input voltages, namely the RTD voltage appearing on lead 195 or one of two reference voltages (v$_{ref1}$ or v$_{ref2}$ which are illustratively 1.9 and zero volts, respectively) to an input of RTD input circuit 41 for subsequent conversion by V/F converter 41 situated therein. Reference voltage v$_{ref1}$ is supplied via lead 38, from reference voltage generator 39 which itself contains a well known highly stable voltage source that exhibits negligible drift with temperature variations. As will be discussed hereinbelow and particularly with reference to RTD Temperature Processing Routine 1100 (discussed in conjunction with FIG. 11), the V/F converter is operated to perform a conversion every 0.1 seconds with each of eight analog voltages (of which only those three that are relevant to the present invention being specifically shown and discussed herein) applied to the inputs (I$_0$, I$_1$ and I$_2$ for the three voltages shown) of analog switch 35 being selected, on a time staggered basis, once every 0.8 seconds for conversion into a corresponding frequency value. Control logic 72 specifies which one of the input voltages to analog switch 35 is to be selected at any one time. The states of circuit 70 are described in considerable detail below in conjunction with state table 400 and timing diagram 500 which are respectively shown in FIGS. 4 and 5.

As circuit 70 cycles through its different states—of which there are eight in total, this circuit writes the value of its current state into an internal register (not shown) which, when accessed by microcomputer 80, applies this value onto leads 85. The microcomputer then reads this value which, in turn, permits it to appropriately process the counted values provided by counters 75 and 78, via corresponding internal registers (not shown) and leads 87 and 88. Leads 87 supply raw timing measurements, designated RAW_RATE_A and RAW_RATE_B, to microcomputer 80 for channel pairs A-C and B-C, respectively. Depending upon the mode in which each channel pair is operating, RAW_RATE_A and RAW_RATE_B will each provide, in terms of counts, a single inter-channel phase difference measurement or a single Δt value for each channel pair. Leads 88 provide the microcomputer with the counted frequency measurement data for the RTD and reference voltages. In addition, logic 72 also writes a value into another internal register (not specifically shown) which specifies which analog voltage is then being selected by analog switch 35 for conversion by RTD input circuit 42. This value is also read, via leads 85, by microcomputer 80.

Furthermore, the microcomputer applies appropriate signals onto leads 84 to control the overall operation of circuit 70. The microcomputer also provides appropriate address signals, via leads 82, to designate to control logic 72 a specific internal register from which the microcomputer is to read data or into which it will write data.

The microcomputer is also connected, via leads 91 and 93, to respectively well known output circuitry 90 which provides a number of standard outputs (such as illustratively a display interface(s), communication ports, 4-20 mA output lead 263 and scaled frequency output lead 262) over leads 26, and to well known input circuitry 95 which provides the meter with interfaces to a number of well known input devices (such as switches, user keypads, communication ports and the like).

Microcomputer 80 utilizes any one of many well known commercially available microprocessors (not specifically shown) along with sufficient random access memory (RAM) 83 for data storage and sufficient read only memory (ROM) 86 for program and constant storage. Inasmuch as this program utilizes an event-driven task architecture, a database is implemented within the microcomputer to facilitate easy transfer and sharing of measured and calculated data among the various tasks. Based upon its input information, specifically the timing measurements, containing the inter-channel phase difference measurements and $\Delta t$ values for each pair of channels, and the counted frequency data along with the state information—all of which are supplied by circuit 70, microcomputer 80 appropriately corrects the measured $\Delta t$ values produced by each channel pair to account for the measured internal phase delay therefor, determines an accurate temperature compensated meter factor and thereafter, using the corrected $\Delta t$ values and this factor, determines the current mass flow and mass flow rate values—all of which is discussed in greater detail below in conjunction with Flow Measurement Basic Main Loop 600 shown in FIG. 6, Zero Determination Routine 700 shown in FIGS. 7A and 7B, Mechanical Zero Routine 800 shown in FIGS. 8A and 8B, and RTD Temperature Processing Routine 1100 shown in FIG. 11.

Figures 4, 4A:
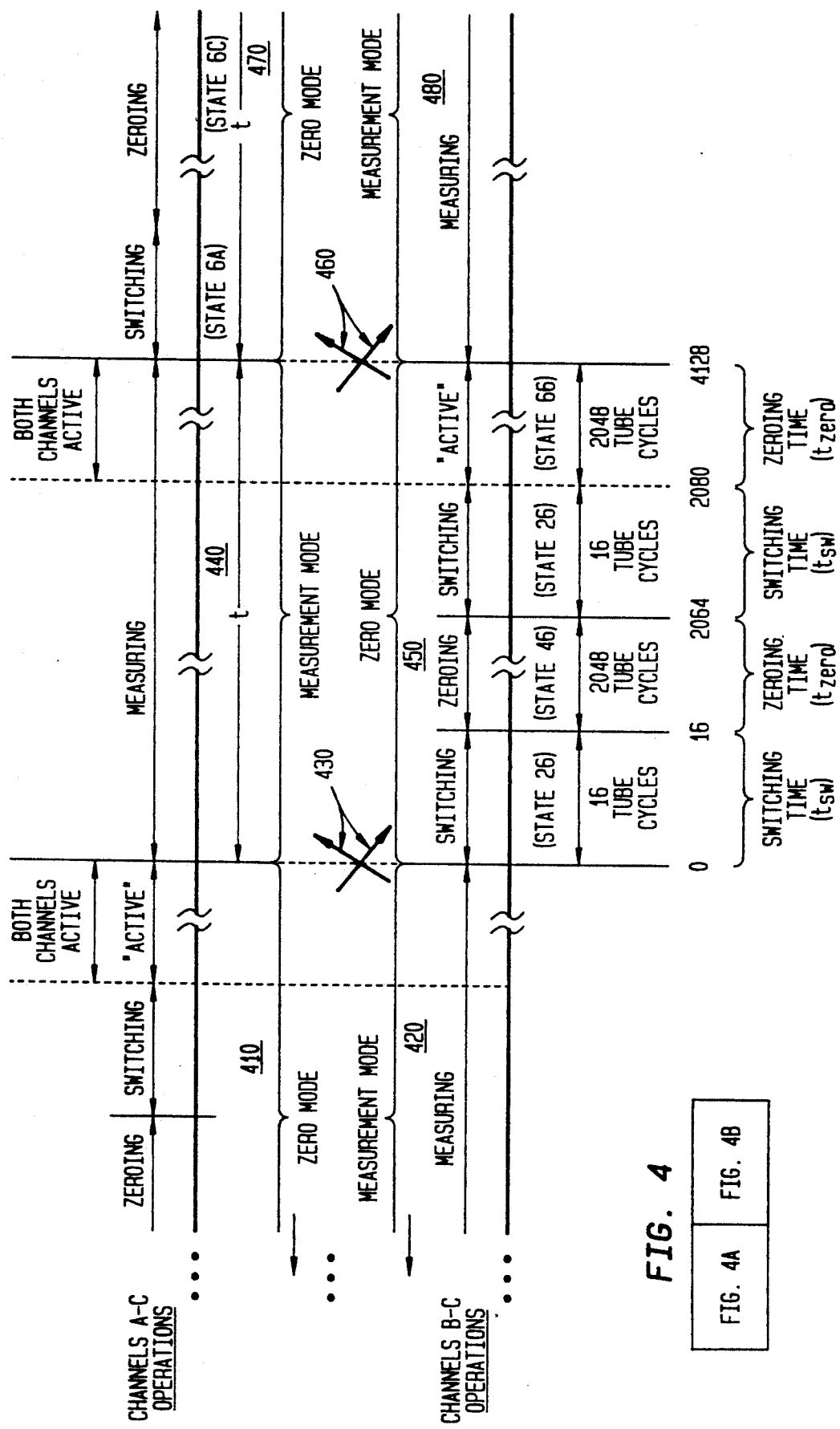

To provide a thorough understanding of the interactions between circuit 70 and microcomputer 80, this discussion will now address timing diagram 400 and state table 500 shown in FIGS. 4A, 4B and 5 which collectively detail the functions provided by circuit 70 and their temporal relationship. To facilitate understanding, the reader should simultaneously refer to FIGS. 4A, 4B and 5 throughout the following discussion.

Timing diagram 400 shown in FIGS. 4A and 4B defines the normal sequential modal operations for each of the channel pairs and the temporal relationships therebetween.

As described above, each of the channel pairs, A-C and B-C, operates in either a measurement mode or a zero mode. While one channel pair operates in the measurement mode, the other operates in the zero mode with these operations reversing at the end of these modes. The duration of each of these modes (the "modal" interval) is always the same, i.e. time "t". In this regard, zero mode 410 for channel pair A-C and measurement mode 420 for channel pair B-C simultaneously operate, as do measurement mode 440 and zero mode 450, zero mode 470 and measurement mode 480 for channel pairs A-C and B-C, respectively. Arrows 430, 460 and 490 signify mode reversal between the channel pairs at the conclusion of three successive modal intervals.

Channel C is continuously supplied with the left (L) velocity sensor signal and serves as the reference channel with respect to which the internal phase delay of each of the other two channels is continually measured. However, the input signals applied to non-reference channels A and B are switched, depending upon the mode of corresponding channel pair A-C and B-C, between the left and right (R) velocity sensor signals with phase difference measurements being taken for each different input configuration to yield inter-channel phase difference measurements or $\Delta t$ values for each pair.

In particular, while a channel pair operates in the measurement mode, the non-reference channel in that pair, e.g. channel A for pair A-C, is supplied with the right velocity sensor signal and measurements are made of the inter-channel phase difference occurring for that pair. These measurements provide raw flow based $\Delta t$ values. These measurements occur throughout the entire time "t" that the channel exists in the measurement mode. During this time, these measurements are provided to the microcomputer for subsequent processing into corresponding mass flow rate values.

By contrast, four separate functions are performed in the following sequence for any channel pair, e.g. pair B-C, during its zero mode: (a) switching the input for the non-reference channel in that pair from the right to the left velocity sensor signal during the switching interval, (b) providing measurements of the internal phase delay for that channel pair (i.e. "zeroing") during the zeroing interval, (c) switching the non-reference channel input back to the right velocity sensor signal again during a switching interval, and (d) permitting that pair to be "active" for a zeroing interval during which measurements of flow based $\Delta t$ values can be made. Since the opposite channel pair, e.g. pair A-C, will be actively measuring flow based $\Delta t$ values during its measurement interval while channel pair B-C is active, both channels are able to concurrently provide flow based $\Delta t$ values for the same velocity sensor signals during this "active" interval. If additional error checking is needed, the microcomputer can process the measurements provided by the "active" channel pair and compare the resulting corrected $\Delta t$ values against those being provided using the other channel pair. A sufficient discrepancy therebetween would generally indicate an error condition.

As illustratively shown in FIGS. 4A and 4B, each switching interval is 16 tube cycles in duration, while each zeroing interval occurs over 2048 successive tube cycles. Accordingly, time "t" formed of two interleaved switching and zeroing intervals occurs for 4128 tube cycles. During meter initialization, microcomputer 80, shown in FIGS. 3A and 3B, loads the durations, in terms of tube cycles, of the switching and zeroing intervals into circuit 70 and specifically control logic 72 therein.

As shown in state table 500 depicted in FIG. 5 for circuit 70, this circuit, in normal operation, continuously cycles through eight states in sequence, illustratively designated as states 26, 46, 26, 66, 6A, 6C, 6A and 6E—of which two states, i.e. states 26 and 6A, are repeated.

Each of these states exists for a fixed duration, either the switching interval or the zeroing interval. During all eight states, the left velocity sensor signal is continuously applied to the input of reference channel C.

For the first four states (states 26, 46, 26 and 66), channel pair A-C operates in the measurement mode (hereinafter referred to as the channel A measurement mode) while channel pair B-C concurrently operates in its zero mode (hereinafter referred to as the Channel B zero mode). Throughout the channel A measurement mode, circuit 70 generates a low level on multiplexor select signal RPO_A such that the right velocity sensor signal is continuously applied to the input of channel A. During this mode, as indicated by the letter "X", channel pair A-C provides flow based $\Delta t$ values and hence serves as the measuring channel pair. In addition, at the beginning of state 26, circuit 70 commences the beginning of the channel B zero mode by initially applying a high level to multiplexor select signal RPO_B in order to first switch the channel B input from the right to the left velocity sensor signal. This commences Channel B Switching state 26 during which channel pair B-C undertakes no measurements but merely affords an adequate period of time, i.e. switching interval $t_{SW}$, for all switching transients and similar perturbations on channel B to settle out. Once this state is completed, circuit 70 invokes Channel Pair B-C Zeroing state 46. During state 46, which lasts for zeroing interval $t_{ZERO}$, inter-channel phase difference measurements are continually made by circuit 70 for channel pair B-C. These measurements are read and averaged by the microprocessor to yield a measurement, in counts, of the internal phase delay for that channel pair. At the conclusion of the zeroing interval, Channel B Switching state 26 re-occurs to switch the input of channel B from the left velocity sensor signal back to the right velocity sensor signal. To do so, circuit 70 generates a low level on multiplexor select signal RPO_B. Again, this state, during which no measurements are made on channel pair B-C, remains in existence for the switching interval in order to allow all switching transients and the like on channel B to settle out. At the conclusion of state 26, Both Channels Active state 66 occurs for a zeroing interval during which both channels are "active" and flow based $\Delta t$ measurements can be made, if desired, through channel pair B-C in addition to those measurements simultaneously occurring through channel pair A-C. At the conclusion of state 66, states 6A, 6C, 6A and 6E occur in sequence which merely provide the same operations but on the opposite channel pairs. All the states then repeat in seriatim, and so on.

B. Software Description

With the above understanding in mind, the discussion will now address various aspects of the software executed by microcomputer 80 shown in FIGS. 3A and 3B. Inasmuch as the microcomputer performs a number of well relevant to the present invention—such as providing a database manager and an appropriate operating system environment for a task based application program, then, to simplify the following discussion, all of these functions and the accompanying software therefor have been omitted herefrom.

FIG. 6 depicts a simplified flowchart of Flow Measurement Basic Main Loop 600. This routine provides the basic flow measurement functions.

Upon entry into routine 600, execution proceeds to block 610 which reads current raw phase difference measurement data (RAW_RATE_A and RAW_RATE_B) and state information from circuit 70. Depending upon the current mode of each channel pair, RAW_RATE_A and RAW_RATE_B will each provide, in counts, either a single interchannel phase difference measurement or a single $\Delta t$ value. After block 610 executes, block 620 is executed. This block executes Zero Determination Routine 700 which, in response to the raw phase difference measurements and state information and as discussed in detail below, processes the phase difference data for the channel pair that is currently operating in the measurement mode as a flow based $\Delta t$ value and processes the phase difference data for the other channel pair as an inter-channel phase difference measurement. This measurement is used by this routine to determine the electronic zero value for that latter channel pair. The electronic zero consists of two values, namely the internal phase delay, expressed in the same counts as $\Delta t$, associated with each of the two channel pairs. Thereafter, routine 700 determines the mechanical zero for the Coriolis meter. The mechanical zero is an offset value in the $\Delta t$ measurements that is obtained, as described below, during a zero flow condition occurring during meter calibration. After these operations are completed, routine 700 then corrects the current $\Delta t$ value measured for the channel pair operating in the measurement mode by the mechanical zero for the meter and by the most current electronic zero value for that pair—this electronic zero value having been previously determined while that pair was last operating in its zero mode.

After routine 700 has fully executed, execution proceeds from block 620 to 630. The latter block, when executed, filters the corrected $\Delta t$ value produced by block 620 through a double pole software filter to remove noise and the like thereby yielding a current filtered $\Delta t$ value. Execution next proceeds to block 640 which calculates the current volumetric and mass flow rates using the current filtered $\Delta t$ value and the temperature corrected rate factor. This temperature factor is updated on a periodic basis through RTD Temperature Processing Routine 1100 which, as described in detail below, executes on an interrupt basis.

Upon completion of block 640, block 650 is executed. This latter block tests the volumetric and mass flow rate values against corresponding low flow (cutoff) limit conditions and, if these conditions are met, temporarily sets the volumetric and mass flow rates to zero. Thereafter, execution proceeds to block 660 which, when executed, stores the current volumetric and mass flow values in the database for subsequent use, such as for periodic updating of the displays, totalized flow readings and/or meter outputs. Execution then loops back to routine 610 and so on.

Figure 7B:
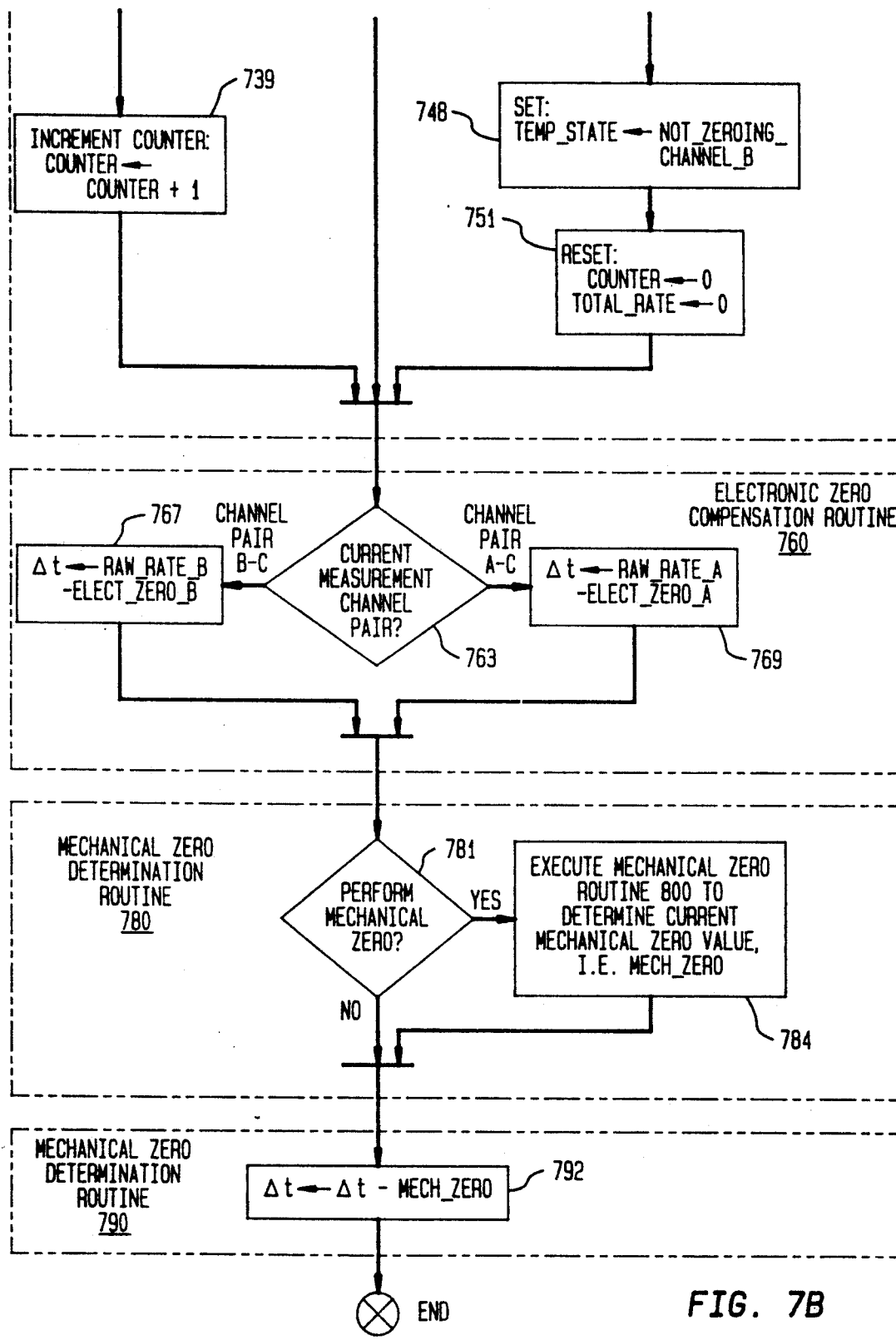

A flowchart of Zero Determination Routine 700 is collectively depicted in FIGS. 7A and 7B for which the correct alignment of the drawing sheets is shown in FIG. 7. This routine contains four separate sections: Electronic Zero Determination Routine 710, Electronic Zero Compensation Routine 760, Mechanical Zero Determination Routine 780, and Mechanical Zero Compensation Routine 790. As generally discussed above, routine 700, specifically through routine 710, determines the current flow based $\Delta t$ value for the channel pair currently operating in the measurement mode and determines the current electronic zero value for the other channel pair operating in its zero mode. Routine 760 compensates each current measured $\Delta t$ value from the channel pair operating in the measurement mode by the most recent electronic zero value for that channel. Routine 780 determines the mechanical zero for the meter. Finally, routine 790 corrects the flow based $\Delta t$ value for the current channel pair operating in its measurement mode by the mechanical zero value for the meter.

Specifically, upon entry into routine 700 and specifically into routine 710, execution first proceeds to decision block 703. This block determines whether the value of variable STATE indicates that channel pair A-C is zeroing, i.e. the state of circuit 70 is given by the value "6C" (see FIG. 5). This value is provided by circuit 70 upon inquiry by microprocessor 80 (see FIGS. 3A and 3B). In the event that this state is now occurring, then execution proceeds, via the YES path emanating from decision block 703 as shown in FIGS. 7A and 7B, to block 706. This latter block when executed, updates the value of a totalized rate variable (TOTAL_RATE) with the current value of RAW_RATE_A. As will be seen at the conclusion of the zeroing interval, this totalized rate value is set equal to zero. Next, block 709 is executed to set the state of a temporary flag (TEMP_STATE) to a value (ZEROING_CHANNEL_A) that signifies that channel pair A-C is presently undergoing zeroing. Once this occurs, execution proceeds to block 712 to merely increment the value of a loop counter (COUNTER) by one. Execution then proceeds to decision block 730. Alternatively, in the event that the current value of variable STATE indicates that channel pair A-C is not zeroing, then execution proceeds, via the NO path emanating from decision block 703, to decision block 715. The latter decision block tests the state of the temporary flag to determine if zeroing has just terminated for channel pair A-C, i.e. whether the value of this flag still equals ZEROING_CHANNEL_A. In the event that zeroing has just terminated for this channel pair, then decision block 715 routes execution, via its YES path, to block 718. This latter block, when executed, calculates the electronic zero value for channel pair A-C, i.e. ELECT_ZERO_A, as a simple average value of the separate measurements that have been totalized, specifically the value of the variable TOTAL_RATE divided by the contents of loop counter COUNTER. Once this has occurred, execution proceeds to block 721 which sets the value of the temporary flag to another value, here NOT_ZEROING_CHANNEL_A, that signifies that channel pair A-C is not undergoing zeroing. Thereafter, execution proceeds to block 724 which merely resets the values of both the loop counter and the totalized rate variable to zero. Execution then proceeds to decision block 730. Alternatively, execution also proceeds to this decision block, via the NO path emanating from decision block 715, in the event that channel pair A-C has not been and has not just completed zeroing.

Blocks 730 through 751 provide the same operations as do blocks 703-724 but for determining the value of the electronic zero for channel pair B-C, i.e. ELECT_ZERO_B. Specifically, decision block 730 determines whether the value of variable STATE indicates that channel pair B-C is zeroing, i.e. the state of circuit 70 is given by the value "46" (see FIG. 5). In the event that this state is now occurring, then execution proceeds, via the YES path emanating from decision block 730 as shown in FIGS. 7A and 7B, to block 733. This latter block, when executed, updates the value of the totalized rate variable, TOTAL_RATE, with the current value of RAW_RATE_B. As will be seen at the conclusion of this zeroing interval, this totalized rate value is set equal to zero. Next, block 736 is executed to set the state of the temporary flag, TEMP_STATE, to a value (ZEROING_CHANNEL_B) that signifies that channel pair B-C is presently undergoing zeroing. Once this occurs, execution proceeds to block 739 to merely increment the value of the loop counter, COUNTER, by one. Execution then proceeds to routine 760. Alternatively, in the event that the current value of variable STATE indicates that channel pair B-C is not zeroing, then execution proceeds, via the NO path emanating from decision block 730, to decision block 742. The latter decision block tests the state of the temporary flag to determine if zeroing has just terminated for channel pair B-C, i.e. whether the value of this flag still equals ZEROING_CHANNEL_B. In the event that zeroing has just terminated for this channel pair, then decision block 742 routes execution, via its YES path, to block 745. This latter block, when executed, calculates the electronic zero value for channel pair B-C, i.e. ELECT_ZERO_B, as a simple average value of the separate measurements that have been totalized, specifically the value of the variable TOTAL_RATE divided by the contents of loop counter COUNTER. Once this has occurred, execution proceeds to block 748 which sets the value of the temporary flag to another value, here NOT_ZEROING_CHANNEL_B, that signifies that channel pair B-C is not undergoing zeroing. Thereafter, execution proceeds to block 751 which merely resets the values of both the loop counter and the totalized rate variable to zero. Execution then proceeds to routine 760. Alternatively, execution also proceeds to this routine in the event that channel pair B-C has not been and has not just completed zeroing, i.e. via the NO path emanating from decision block 742. At this point, routine 710 has completed execution. Inasmuch as one of the channel pairs is operating in its zero mode at any one time, then the current value of the corresponding variable ELECT_ZERO_A or ELECT_ZERO_B is being determined at that time with the appropriate steps, as described above, being executed therefor.

Electronic Zero Compensation Routine 760 merely corrects (compensates) the current $\Delta t$ measurement by the electronic zero value for the particular channel pair that produced that measurement. Specifically, upon entry into this routine, execution proceeds to decision block 763 which, based upon whether channel pair B-C or channel pair A-C is currently operating in its measurement mode, respectively routes execution to block 767 or 769. In the event that execution is routed to block 767, then, this block, when executed, subtracts the electronic zero value for channel pair B-C from RAW_RATE_B and stores the result in variable $\Delta t$. Alternately, if execution is routed to block 769, then, this block, when executed subtracts the electronic zero value for channel pair ADC from RAW_RATE_A and stores the result in variable $\Delta t$. After either block 767 or 769 has executed, execution proceeds to Mechanical Zero Determination Routine 780.

Routine 780 determines the current value mechanical zero value for the meter. Specifically, upon entering routine 780, execution proceeds to decision block 781. This block, when executed, determines if a current mechanical zero value is to be found. As noted above, a mechanical zero is determined under no flow conditions during meter calibration. If meter calibration is currently being performed and if a user indicates that no flow is occurring by depressing an appropriate pushbutton on the meter electronics, then decision block 781 routes execution, via its YES path, to block 784. This latter block executes Mechanical Zero Routine 800, as discussed in detail below, to determine the current mechanical zero value (MECH_ZERO) for the meter. Once this value has been determined, execution proceeds to Mechanical Zero Compensation Routine 790. Execution also proceeds to routine 790, via the NO path emanating from decision block 781, in the event that meter calibration is not occurring or if it is that the user has not specified that no flow is occurring.

Mechanical Zero Routine 790 contains block 792, which, when executed, merely subtracts the current mechanical zero value, MECH_ZERO, from the value of variable $\Delta t$ with the result being a corrected $\Delta t$ measurement which will be subsequently filtered and used by main loop 600 (specifically blocks 630 and 640 therein a shown in FIGS. 6A and 6B) to determine the current value for mass flow rate. Once block 792 has executed, execution exits from routines 790 and 700, as shown in FIGS. 7A and 7B, and returns to Flow Measurement Basic Main Loop 600.

To simplify the software, routine 700 does not include appropriate software for determining corresponding corrected $\Delta t$ values for both channel pairs during each "active" interval and, as discussed above, comparing the results to detect sufficient discrepancies therebetween and system errors associated therewith. Routine 700 can be readily modified by any one skilled in the art to include this software.

Figure 8B:
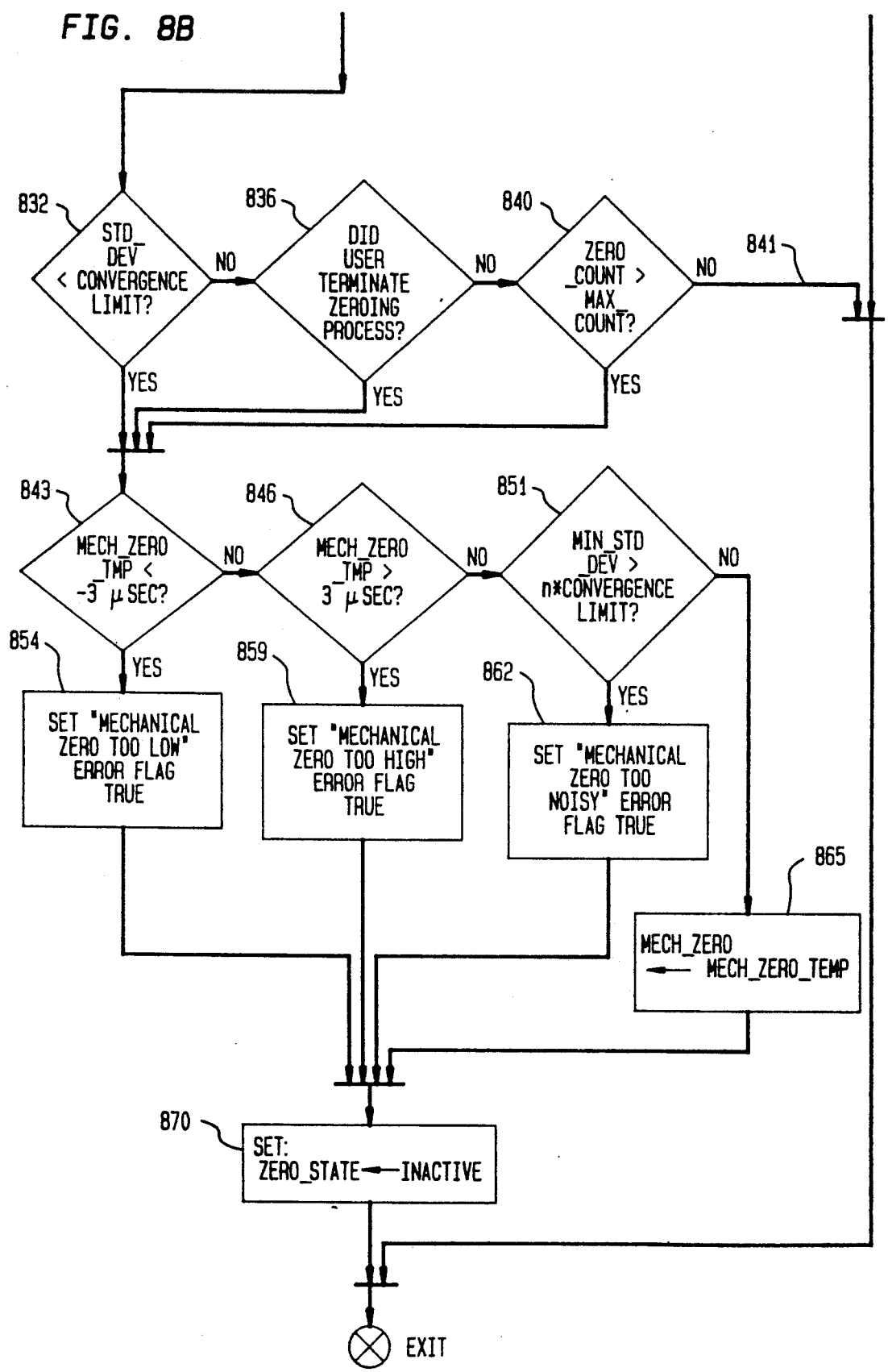

FIGS. 8A and 8B collectively depict a flowchart of Mechanical Zero Routine 800; the correct alignment of the drawing sheets for this figures is shown in FIG. 8. As discussed above, routine 800 determines the current value for the mechanical zero of the meter. In essence and as discussed above, the current value of this zero is determined by first calculating the standard deviation, $\sigma_{\Delta t}$, of the $\Delta t$ values obtained for a no flow condition during meter calibration. This standard deviation provides a measure of the noise appearing on the $\Delta t$ measurements at a no flow condition. Only if the noise is sufficiently low, i.e. the value of the standard deviation is below a minimum threshold value, will the most recent value for the mechanical zero be updated to reflect its current value; otherwise, this current value will simply be ignored. The number of measured $\Delta t$ values used in determining the standard deviation is governed by any one of three criteria: (a) when the "running" standard deviation decreases below a convergence limit, (b) a user terminates the mechanical zeroing by depressing an appropriate pushbutton, or (c) if a pre-defined number of measured $\Delta t$ values has been taken. In addition, appropriate limits checks are made to ensure that the current value of the mechanical zero lies within predefined bounds prior to replacing its most recent value with its current value.

Specifically, upon entry into routine 800, execution proceeds to decision block 803. This block, when executed, tests the status of a flag (ZERO STATE) to specify whether the process of determining a mechanical zero is currently occurring. This flag is set by appropriate software (not shown) to commence this process. In the event that this process is underway, decision block 803 routes execution, via its YES path, to block 806. This latter block, when executed, updates the value of a totalized variable (ZERO_TOTAL) with the current $\Delta t$ value. As will be seen later, this totalized value is set equal to zero at the conclusion of the zeroing interval. Once block 806 has executed, execution proceeds to block 809 to increment the contents of a loop counter, ZERO_COUNT, by one. Thereafter, execution proceeds to decision block 820. Alternatively, if a mechanical zero value is not currently being determined, i.e the status of the ZERO STATE flag is now not active, then execution proceeds, via the NO path emanating from decision block 803, to block 812. This latter block resets the ZERO_STATE flag to the active state, sets the values of both the ZERO_TOTAL and loop counter ZERO_COUNT to zero, and set the value of variable, MIN_STD_DEV, to a large predefined number (the exact value of which is not critical as long as it is well in excess of the expected value of the standard deviation). Thereafter, block 816 is executed to reset all the error flags that are associated with the mechanical zero process. After this occurs, execution proceeds to decision block 820.

Decision block 820, when executed, determines whether a minimum number of measured $\Delta t$ values has occurred to determine a mechanical zero value—i.e. specifically whether the current value of loop counter ZERO_COUNT exceeds a predefined minimum value, MIN_ZERO_COUNT which typically equals the decimal value "100". In the event that an insufficient number of $\Delta t$ values has occurred, then execution exits from routine 800, via path 872 and NO path 822 emanating from decision block 820. Alternatively, if a minimum number of $\Delta t$ values has occurred, then decision block 820 routes execution, via its YES path, to block 823. This latter block, when executed, updates the standard deviation, $\sigma$, of the $\Delta t$ values that have been currently measured thusfar for use in determining a mechanical zero value and stores the result in variable STD_DEV. Once this occurs, execution proceeds to decision block 826 which tests the resulting standard deviation value against a minimum value therefor. In the event that the resulting standard deviation is less then the minimum value, decision block 826 routes execution, via its YES path, to block 829. This latter block calculates a temporary current value for the mechanical zero (MECH_ZERO_TEMP) as being an average of the totalized $\Delta t$ values obtained thusfar during the current mechanical zero process, i.e. the value of ZERO_TOTAL divided by the contents of loop counter ZERO_COUNT. Once this occurs, block 829 sets a minimum standard deviation value equal to the current value of the standard deviation. By doing so, the minimum value of the standard deviation that has been determined thusfar for this current mechanical zero process will always be used, in the manner discussed below, to determine whether the current value of the mechanical zero is too noisy and hence unacceptable. Once block 829 fully executes, execution proceeds to decision block 832. Alternatively, execution also proceeds to this decision block, via the NO path emanating from decision block 826, in the event that the current value of the standard deviation now equals or exceeds its minimum value.

At this point, up to three separate tests are undertaken in seriatim through decision blocks 832, 836 and 840 to determine if a sufficient number of measured $\Delta t$ values has been taken to determine the current mechanical zero value. Such measurements continue until a sufficient number has occurred. In particular, decision block 832 determines whether the current value of the standard deviation is less than a convergence limit. In this case, if the standard deviation has been falling with successive $\Delta t$ values and has fallen below a predefined limit value, then it is very unlikely that any additional measurements will adversely impact the mechanical zero value. Accordingly, if the standard deviation has decreased in this manner, than decision block 832 routes execution, via its YES path, to decision block 843. Alternatively, if the current value of the standard deviation is still higher than the convergence limit, then execution proceeds, via the NO path emanating from decision block 832, to decision block 836. This latter decision block determines whether the user has depressed a pushbutton or otherwise provided an appropriate indication to the meter to terminate the current mechanical zero process. In the event that the user terminated this process, then decision block 836 routes execution, via its YES path, to decision block 843. Alternatively, if the user has not terminated the current mechanical zero process, then decision block 836 routes execution, via its NO path, to decision block 840. Decision block 840, when executed, determines whether a maximum number, MAX_COUNT, of the measured $\Delta t$ values has just occurred. In the event that this maximum number of measurements, e.g. 2000 measurements, has occurred, then decision block 840 routes execution, via its YES path, to decision block 843. Alternatively, if the maximum number of such measurements has not occurred, then execution exits from routine 800, via NO path 841 emanating from decision block 840 and via path 872, in order to appropriately process the next successive $\Delta t$ measurement.

At this point in routine 800, a current value, though temporary, for the mechanical zero has been determined based upon a sufficient number of successive $\Delta t$ measurements. Decision blocks 843, 846 and 849 now determine whether this mechanical zero value lies within predefined limits, e.g. illustratively $\pm 3$ $\mu$sec, and whether this mechanical zero value is relatively noise-free. Specifically, decision block 843 determines whether the current temporary mechanical zero value is less than a lower limit, i.e. illustratively $-3$ $\mu$sec. In the event that this limit is negatively exceeded, then decision block 843 routes execution, via its YES path, to block 854. Since this signifies an error condition, block 854, when executed, sets the value of an appropriate error flag, i.e. MECHANICAL ZERO TOO LOW, to true. Alternatively, if the lower limit is not negatively exceeded, then decision block 843 routes execution, via its NO path, to decision block 846. This latter decision block determines whether the current temporary mechanical zero value is greater than an upper limit, i.e. illustratively $+3$ $\mu$sec. In the vent that this limit is positively exceeded, then decision block 846 routes execution, via its NO path, to block 859. Since this signifies an error condition, block 859, when executed, sets the value of an appropriate error flag, i.e. MECHANICAL ZERO TOO HIGH, to true. The upper and lower $\pm 3$ $\mu$sec limit values were determined empirically as being those values within which all no-flow based $\Delta t$ values should lie for meters that are currently manufactured by the present assignee. Alternatively, if neither of these limits is exceeded, then decision block 846 routes execution, via its NO path, to decision block 851. This latter decision block determines whether the temporary mechanical zero value is sufficiently noise-free, i.e. whether all the successive $\Delta t$ values that are utilized to generate this value possess less than a given variability, by comparing the present minimum standard deviation value against a limit equal to a preset integer multiple ("n") of, typically twice, the convergence limit.

In this regard, the most repeatable value for the mechanical zero tends to occur when the standard deviation reaches its minimum value. It appears that this occurs because the measured $\Delta t$ values will be corrupted by periodic noise, such as 60 Hz hum and its harmonics, that beats against the sampling rate of the velocity sensor signals (i.e. counters 75 are read once every tube cycle) thereby creating beat frequencies that appear in the measured $\Delta t$ values. In normal operation, I expect that some noise of this type will always be present, though the amplitude of the noise will usually vary from one installation to another. For the range of meters manufactured by the present assignee, the velocity signals have fundamental frequencies in the range of 30-180 Hz. The amplitude of the beat frequencies will be lowest when the noise is in-phase with this sampling rate and will increase as the noise gets progressively out-of-phase with the sampling rate thereby leading to increased variability and error in the measured no flow $\Delta t$ values. Hence, the minimum value of the standard deviation is used to determine whether the resulting mechanical value will be too noisy. Specifically, if decision block 851 determines that the minimum standard deviation exceeds the limit of "n" times the convergence limit, then the current temporary mechanical zero value is simply too noisy and is ignored. Since this signifies an error condition, decision block 851 routes execution, via its YES path, to block 862. This latter block, when executed, sets the value of an appropriate error flag, i.e. MECHANICAL ZERO TOO NOISY, to true. Alternatively, if the minimum standard deviation is sufficiently low, hence indicating that the temporary mechanical zero value, is relatively noise-free, then decision block 851 routes execution, via its NO path, to block 865. This latter block updates the mechanical zero value, MECH_ZERO, as being equal to the value of the temporary mechanical zero, ME-CH_ZERO_TEMP. Once block 854, 859, 862 or 865 has executed, execution proceeds to block 870 which, in turn, sets the state of flag ZERO_STATE to inactive to reflect that the mechanical zero process has been terminated and is now not in progress. Once this occurs, execution then exits from routine 800.

Having described the mechanical zero process, FIG. 9 diagrammatically shows the associated zeroing operations that occur for each corresponding range in the standard deviation, $\sigma_{\Delta t}$, that can be obtained during this process. Specifically, whenever the value of $\theta_{\Delta t}$ lies within region 910 and hence is less than the convergence limit (1), zeroing immediately stops and the resulting mechanical zero value is accepted. For any value of $\theta_{\Delta t}$ lying within region 920 and hence greater than the convergence limit but less than "n" times that limit, zeroing continues until a maximum number, as given by the value of variable MAX_COUNT, of $\Delta t$ measurements has occurred. This number, in tube cycles, defines a maximum zeroing interval. For any value of $\sigma_{\Delta t}$ that lies within region 930 and hence exceeds "n" times the convergence limit, zeroing immediately halts. The associated current mechanical zero value is simply ignored in favor of its most recent value.

FIG. 10 diagrammatically shows the ranges of acceptable and non-acceptable mechanical zero values. As shown, erroneous mechanical zero values are those which lie either within region 1020 and hence are negatively greater than the negative limit of $-3$ μsec or those which lie within region 1030 and are positively greater than the positive limit of $+3$ μsec. If the mechanical zero is determined as having any of these values, that value is simply ignored. Only those values for the mechanical zero that lie within region 1010 and hence are situated between the negative and positive limits are accepted.

Figure 11:
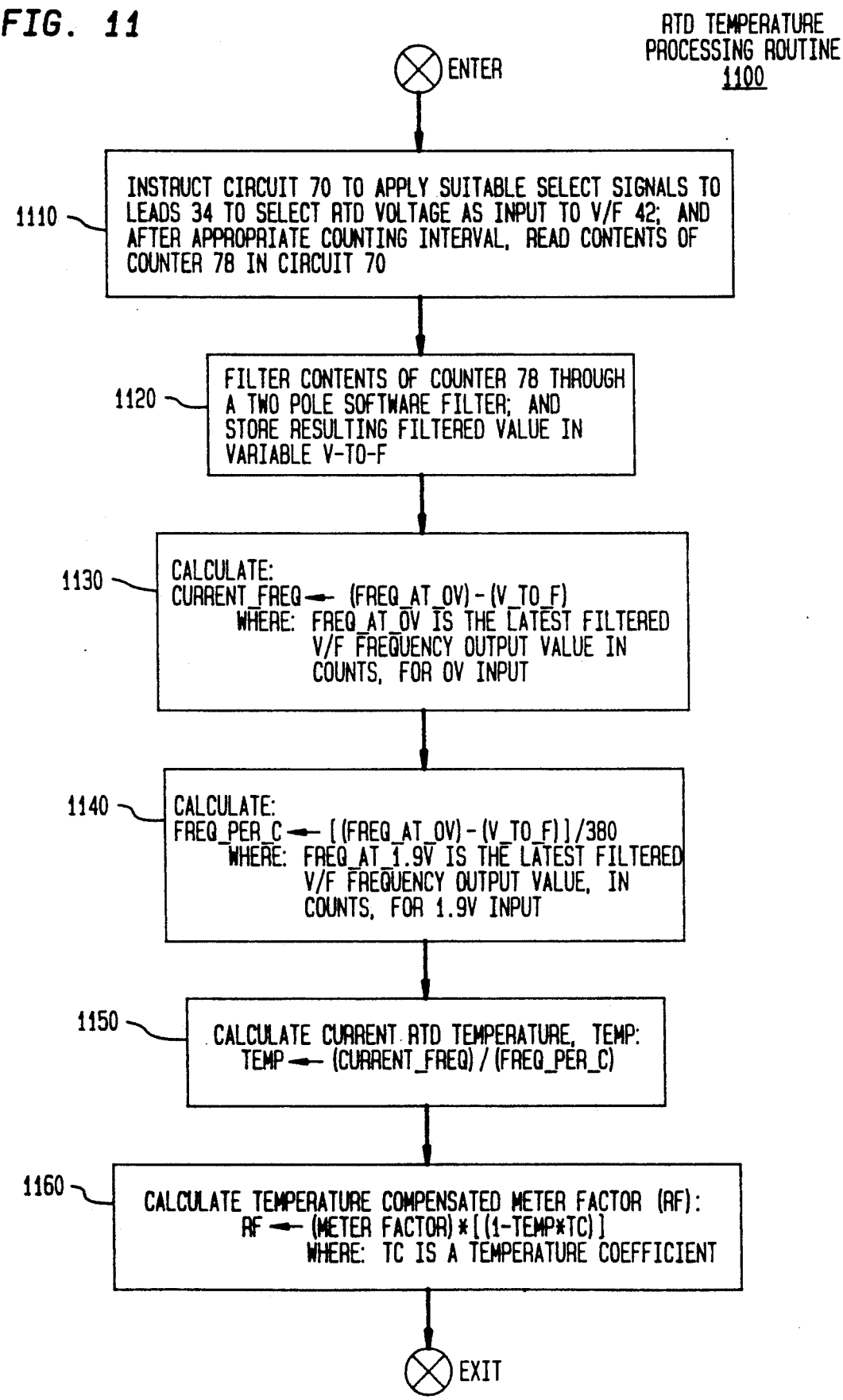
FIG. 11 shows a flowchart of RTD Temperature Processing Routine 1100 which is executed on a periodic interrupt basis by microprocessor 80 that is contained within inventive flow measurement circuit 30 shown in FIGS. 3A and 3B.

FIG. 11 shows a flowchart of RTD Temperature Processing Routine 1100. As discussed above, this routine operates on a periodic interrupt basis, every 0.8 seconds, to provide a digitized flow tube temperature value that is essentially insensitive to temperature drift of the RTD and, using that value, calculates a current value for the temperature compensated meter factor (RF). This value is then stored in the database within the microcomputer for subsequent use by routine 600 in determining a current mass flow rate value.

Upon entry into routine 1100, execution proceeds to block 1110. This block, when executed, causes analog switch 35 to route the RTD voltage to the input of V/F converter 41 (see FIGS. 3A and 3B) for subsequent conversion. To specifically effectuate this, microprocessor 80 applies suitable address and control signals, via leads 82 and 84, to circuit 70 and particularly to control logic 72 situated therein. These signals, in turn, instruct that logic to apply the appropriate select signals over leads 34 to the analog switch. After this occurs and an appropriate counting interval has elapsed, block 1110, shown in FIG. 11, reads the contents of counter 78, shown in FIGS. 3A and 3B, which contains a counted value proportional to the frequency converted analog RTD voltage. Thereafter, as shown in FIG. 11, execution proceeds to block 1120. This block, when executed, filters the contents that have been read from counter 78 through a two-pole software filter and stores the resulting filtered value in temporary variable V_TO_F.

After this occurs, block 1130 is executed which eliminates a zero offset value from the filtered value to yield a current frequency value, CURRENT_FREQ. This zero offset value, FREQ_AT_OV, is a non-zero filtered counted frequency output value produced by the V/F converter with a zero input voltage ($v_{ref1}$) applied thereto. Thereafter, block 1140 is executed to calculate a proportionality factor, FREQ_PER_C, that specifies the number of counts per degree C. This factor is simply given by the difference in the filtered counted values for two reference voltages ($v_{ref1}$ and $v_{ref2}$ which are illustratively ground potential and 1.9V, respectively) divided by the decimal number "380". Since the counted frequency values for both reference voltages are obtained essentially contemporaneously with any change in the flow tube temperature, then any temperature drift produced by the V/F converter will inject an essentially equal error component into both of these counted values. Inasmuch as the proportionality factor is calculated using the difference between these counted values rather than the magnitude of either value alone, the value of the proportionality factor will be essentially unaffected by any shift in the counted V/F output attributable to temperature drift. The zero offset value (FREQ_AT_OV) and the filtered counted 1.9V reference value (FREQ_AT_1.9V) are both determined on a periodic interrupt basis, again every 0.8 seconds, by another routine not shown. This routine, which would be readily apparent to anyone skilled in the art, causes circuit 70 to apply appropriate select signals to the analog switch to first route on a time staggered basis either the ground potential ($v_{ref1}$) or 1.9V ($v_{ref2}$) to the input of V/F converter 41, and then sequentially count the frequency value produced therefrom and thereafter read and filter this value and store the filtered results.

Once the proportionality factor has been determined by block 1140, execution proceeds to block 1150. This block calculates the current temperature (TEMP) sensed by the RTD by dividing the current frequency value by the proportionality factor. Thereafter, execution proceeds to block 1160 which calculates the temperature compensated meter factor RF using a meter factor value and the current temperature value. For a Coriolis meter, its meter factor is a known constant that is determined empirically during manufacture. Once this temperature compensated meter factor is calculated, it is stored in the database for subsequent use in determining mass flow rate. Execution then exits from routine 1100.

Those skilled in the art will now certainly realize that although both channel pairs are operated in parallel, such that one pair is operating in its zero mode while the other pair is operating in its measurement mode, these channel pairs could be sequentially operated. In this instance, an operating channel pair would function in its zero and/or measurement modes while the other channel pair remained in a standby status. The channel pairs could then periodically switch from operating to standby status at the conclusion of each mode or after the operating channel pair sequentially undertook both its zero and measurement modes. Since, with sequential operation, one channel pair is always in the standby status at any one time, then, to simplify the circuitry, one channel pair rather than two could be used with that one pair always operating and continuously cycling between its measurement and zero modes. In those instances when the one effectively operating channel pair is undertaking its zero mode, no flow measurements would then be being made. Accordingly, an assumption, in lieu of actual flow measurements, would need to be made regarding the flow that is occurring during that time. Hence, by eliminating continuous flow measurements, the use of effectively only one operating channel pair at any one time in a Coriolis flow meter—regardless of whether the meter contains only one physical channel pair that is cycled between its two modes or two pairs with one such pair being inactive at any one time, may provide flow measurements that are somewhat inaccurate. By contrast, since my inventive flow measurement circuit 30 always has one channel pair that, during normal flow metering operations, is actively measuring actual flow at any time, the meter provides very accurate flow measurements at the expense of a slight increase in circuit complexity.

Furthermore, although an "active" interval has been provided within the zero mode for any channel pair during which, for example, dual flow measurements and inter-channel pair comparisons thereof could be made, this interval could be eliminated, if needed, with no adverse affect on meter accuracy. In fact, doing so could either be used to shorten the duration of the zero mode by one zeroing interval (i.e. the time during which the channel pair would otherwise operate in the "active" interval) or lengthen the time during which that channel pair is actually zeroing by appropriately increasing the number of internal phase delay measurements that are to be taken then.

Also, those skilled in the art recognize that, although the disclosed embodiment utilizes U-shaped flow conduits, flow conduits (tubes) of almost any size and shape may be used as long as the conduits can be oscillated about an axis to establish a non-inertial frame of reference. For example, these conduits may include but are not limited to straight tubes, S-shaped conduits or looped conduits. Moreover, although the meter has been shown as containing two parallel flow tubes, embodiments having a single flow tube or more than two parallel flow tubes—such as three, four or even more—may be used if desired.

Although a single embodiment of the invention has been shown and described in detail herein, many other varied embodiments that still incorporate the teachings of the present invention can be readily fabricated by those skilled in the art.

I claim:

1. A Coriolis meter for measuring flow rate of a process fluid flowing therethrough comprising:
   at least one flow conduit;
   means for oscillating the conduit;
   means for sensing movement of said conduit caused by opposing Coriolis forces induced by passage of the process fluid through said flow conduit and for producing first and second sensor signals responsive to said sensed movement of said conduit; and
   circuit means, responsive to said first and second sensor signals, for providing a flow rate value of said process fluid, said circuit means comprising:
   first, second and third input channels for respectively producing first, second and third channel output signals;
   counting and processing means comprising:
      counting means, responsive to said first, second and third channel output signals for determining first and second internal phase delay values respectively associated with first and second pairs of said input channels and for respectively measuring first and second time difference ($\Delta t$) values for said first and second pairs of the input channels; and
      means, responsive to said first and second internal phase delay values and said first and second $\Delta t$ values, for compensating said first $\Delta t$ value by said first internal phase delay value to yield a first compensated $\Delta t$ value and for compensating said second $\Delta t$ value by said second internal phase delay value to yield a second compensated $\Delta t$ value;
   means for selectively routing said first or second sensor signals to corresponding inputs of said first, second and third input channels; and
   control means, connected to said selectively routing means and to said counting and processing means, for specifying which one of said sensor signals is to be simultaneously applied as input to each one of the input channels and for operating said selectively routing means and said first and second pairs of the input channels in conjunction with said counting means such that while the first pair is determining the first internal phase delay value the second pair is measuring the second $\Delta t$ value and for reversing operation of said channel pairs after a pre-defined interval of time has elapsed such that the first pair will measure the first $\Delta t$ value while the second pair will determine the second internal phase delay value; and
   said counting and processing means further comprises:
      processing means for determining the flow rate of the process fluid as a pre-defined function of the first and second compensated $\Delta t$ values.

2. The meter in claim 1 wherein said first and second internal phase delay values are measured while the process fluid flows through the meter.

3. The meter in claim 2 wherein the control means comprises means for operating each of the pairs of the input channels in first and second modes, such that in the first mode said selectively routing means routes a reference signal to the inputs of both of the input channels in said each pair and said counting means measures a third time difference value between corresponding points on the channel output signals provided by both of the channels in said each pair, said third time difference value representing the internal phase delay value associated with said each pair, and such that in said second mode said selectively routing means routes said first and second sensor signals to corresponding ones of the inputs of both of the input channels in said each pair and said counting means measures a plurality of $\Delta t$ values associated with said each pair.

4. The meter in claim 3 wherein said reference signal is either said first or second sensor signals.

5. The meter in claim 4 wherein said compensating means further comprises:
   means, responsive to said third time difference value and operative during said first mode for the first and second channel pairs for respectively generating the first and second internal phase delay values; and
   means, operative during the second mode for the first and second channel pairs, for separately compensating each of the values in corresponding pluralities of first and second measured $\Delta t$ values by the first and second internal phase delay values obtained during said first mode for said first and second channel pairs, respectively.

6. The meter in claim 5 wherein said control means further comprises means for continuously cycling each of said first and second channel pairs between the first and second modes.

7. The meter in claims 1 or 6 wherein said circuit means further comprises:
   input multiplexor means, connected to said first and second sensor signals, for providing first, second and third multiplexor outputs and, operative in response to select signals, for selectively routing said first or second sensor signals to each of said first, second or third multiplexor outputs;
   the first, second and third input channels, having first, second and third channel inputs, for respectively providing first, second and third channel output signals each exhibiting a level change whenever a signal applied to a corresponding one of said first, second or third channel inputs equals a pre-defined level; said first, second and third channel inputs being respectively connected to the first, second and third multiplexor outputs;
   first and second timing means connected to said first and second channel output signals, and to said second and third channel output signals, respectively, so as to define the first and second channel pairs, wherein said first timing means successively measures a first time interval occurring between corresponding points on said first and second channel output signals, and wherein said second timing means successively measures a second time interval occurring between corresponding points on said second and third channel output signals; and said control means further comprises:

logic means, connected to said first and second timing means and to said input multiplexor means, for generating said select signals so as to continuously route said first or second sensor signal to the second multiplexor output and to selectively route either said first or second sensor signal to said first and third multiplexor outputs so as to operate said first and second channel pairs in either said first or second modes.

8. The meter in claim 7 wherein said logic means comprises state selection means for producing an appropriate sequence of said select signals so as to repetitively cycle each of said input channel pairs between the first and second modes.

9. The meter in claim 8 wherein said state selection means further comprises means for generating said select signals and for providing state information signifying a current state of each one of said channel pairs; and said compensating means comprises processor means, operative in response to measurements of the first and second time intervals produced by said first and second timing means and to said state information, for compensating each of the first and second time interval measurements, produced while the first and second channel pairs respectively operated in said second mode, by a value for the internal phase delay respectively obtained for the first and second channel pairs while that channel pair most recently operated in the first mode.

10. The meter in claim 9 wherein said processor means comprise means for respectively producing said first and second internal phase delay values for said first and second channel pairs as an average of the measurements of the first and second time intervals produced by said first and second channel pairs while said first and second channel pairs, respectively, operated in the first mode.

11. The meter in claim 9 wherein, for each one of said first or second channel pairs, the first mode comprises, in succession, a first switching interval during which one of the channel inputs to the one channel pair is switched through said input multiplexor means from the second sensor signal to the first sensor signal, a zeroing interval during which the one channel pair generates the successive measurements of said first or second time intervals, and a second switching interval during which the one channel input is switched through the input multiplexor means back from said first sensor signal to said second sensor signal.

12. The meter in claim 11 wherein the first and second switching intervals are equal in duration to each other and are each sufficiently long enough such that switching transients occurring during each of these intervals decrease to a pre-defined level.

13. The meter in claim 12 wherein the first mode further comprises an active interval commencing after said second switching interval and during which said one channel pair can produce measured $\Delta t$ values while said process fluid flows through said meter.

14. In a Coriolis meter for measuring flow rate of a process fluid flowing therethrough having at least one flow conduit, means for oscillating the conduit, means for sensing movement of said conduit caused by opposing Coriolis forces induced by passage of the process fluid through said flow conduit and for producing first and second signals responsive to said sensed movement of said conduit, and circuitry, responsive to said first and second signals, for providing a flow rate value of the process fluid, said circuitry having first, second and third input channels respectively providing first, second and third channel output signals, a method comprising the steps of:

determining, in response to said first, second and third channel output signals, first and second internal phase delay values respectively associated with first and second pairs of said input channels and respectively measuring first and second time difference ($\Delta t$) values for said first and second pairs of the input channels;

compensating, in response to said first and second internal phase delay values and said first and second $\Delta t$ values, said first $\Delta t$ value by said first internal phase delay value to yield a first compensated $\Delta t$ value and said second $\Delta t$ value by said second internal phase delay value to yield a second compensated $\Delta t$ value;

selectively routing said first or second sensor signals to corresponding inputs of said first, second and third input channels;

specifying, to said selectively routing step, which one of said sensor signals is to be simultaneously applied as input to each one of the input channels and operating said selectively routing means and said first and second pairs of the input channels such that while the first pair is determining the first internal phase delay value the second pair is measuring the second $\Delta t$ value and reversing operation of said channel pairs after a pre-defined interval of time has elapsed such that the first pair will measure the first $\Delta t$ value while the second pair will determine the second internal phase delay value; and determining the flow rate of the process fluid as a pre-defined function of the first and second compensated $\Delta t$ values.

15. The method in claim 14 wherein said first and second internal phase delay values are measured while the process fluid flows through the meter.

16. The method in claim 15 further comprising the step of operating each of the pairs of the input channels in first and second modes, such that in the first mode a reference signal is routed to the inputs of both of the input channels in said each pair and a third time difference value is measured between corresponding points on the channel output signals provided by both of the channels in said each pair, said third time difference value representing the internal phase delay value associated with said each pair, and such that in said second mode said first and second sensor signals are routed to corresponding ones of the inputs of both of the input channels in said each pair and a plurality of $\Delta t$ values associated with, said each pair is measured.

17. The method in claim 16 wherein said reference signal is either said first or second sensor signals.

18. The method in claim 17 wherein said compensating step further comprises the steps of:

generating, in response to said third time difference value respectively occurring during the first mode for the first and second channel pairs, the first and second internal phase delay values; and separately compensating, during the second mode for the first and second channel pairs, each of the values in corresponding pluralities of first and second measured Δt values by the first and second internal phase delay values obtained during said first mode for said first and second channel pairs, respectively.

19. The method in claim 18 wherein said control means further comprises means for continuously cycling each of said first and second channel pairs between the first and second modes.

20. The method in claim 14 or 19 further comprising the steps of:
providing, through an input multiplexor means connected to said first and second sensor signals, first, second and third multiplexor outputs and selectively routing, in response to select signals, said first or second sensor signals to each of said first, second or third multiplexor outputs;
providing through the first, second and third input channels having first, second and third channel inputs, the first, second and third channel output signals each exhibiting a level change whenever a signal applied to a corresponding one of said first, second or third channel inputs equals a pre-defined level; said first, second and third channel inputs being respectively connected to the first, second and third multiplexor outputs;
first and second timing means connected to said first and second channel output signals, and to said second and third channel output signals, respectively, so as to define the first and second channel pairs, wherein in said first timing means successively measuring a first time interval occurring between corresponding points on said first and second channel output signals, and wherein in said second timing means successively measuring a second time interval occurring between corresponding points on said second and third channel output signals; and
generating, through logic means connected to said first and second timing means and to said input multiplexor means, said select signals so as to continuously route said first or second sensor signal to the second multiplexor output and to selectively route either said first or second sensor signal to said first and third multiplexor outputs so as to operate said first and second channel pairs in either said first or second modes.

21. The method in claim 20 wherein said select signal generating step comprises the step of producing an appropriate sequence of said select signals so as to repetitively cycle each of said input channel pairs between the first and second modes.

22. The method in claim 21 said sequence producing step further comprises the steps of:
generating said select signals; and
providing state information signifying a current state of each one of said channel pairs; and
said compensating step comprises the step of compensating, in response to measurements of the first and second time intervals produced by said first and second timing means and to said state information, each of the first and second time interval measurements, produced while the first and second channel pairs respectively operated in said second mode, by a value for the internal phase delay respectively obtained for the first and second channel pairs while that channel pair most recently operated in the first mode.

23. The method in claim 21 further comprising the step of respectively producing said first and second internal phase delay values for said first and second channel pairs as an average of the measurements of the first and second time intervals produced by said first and second channel pairs while said first and second channel pairs, respectively, operated in the first mode.

24. The method in claim 21 wherein, for each one of said
or second channel pairs, the first mode comprises, in succession, a first switching interval during which one of the channel inputs to the one channel pair is switched through said input multiplexor means from the second sensor signal to the first sensor signal, a zeroing interval during which the one channel pair generates the successive measurements of said first or second time intervals, and a second switching interval during which the one channel input is switched through the input multiplexor means back from said first sensor signal to, said second sensor signal.

25. The method in claim 24 the first and second switching intervals are equal in duration to each other and are each sufficiently long enough such that switching transients occurring during each of these intervals decrease to a pre-defined level.

26. The method in claim 25 wherein the first mode further comprises an active interval commencing after said second switching interval and during which said one channel pair can produce measured Δt values while said process fluid flows through said meter.

* * * * *